(12) United States Patent
Itakura et al.

(10) Patent No.: US 6,933,528 B2
(45) Date of Patent: Aug. 23, 2005

(54) IN-PLANE SWITCHING MODE ACTIVE MATRIX TYPE LIQUID CRYSTAL DISPLAY DEVICE AND METHOD OF FABRICATING THE SAME

(75) Inventors: Kunimasa Itakura, Tokyo (JP); Shinichi Nishida, Tokyo (JP); Kimikazu Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/406,091

(22) Filed: Apr. 2, 2003

(65) Prior Publication Data

US 2004/0027525 A1 Feb. 12, 2004

(30) Foreign Application Priority Data

Apr. 4, 2002 (JP) ...................................... 2002-103044
May 31, 2002 (JP) ...................................... 2002-160508
Jun. 5, 2002 (JP) ...................................... 2002-164681

(51) Int. Cl.[7] ........................ H01L 31/20; G09K 1/1343
(52) U.S. Cl. ........................... 257/59; 257/72; 257/222; 257/225; 349/141; 349/143
(58) Field of Search ........................... 257/59, 72, 222, 257/225, 249, 291, 292, 440, 443; 349/110, 111, 139, 141, 143, 147

(56) References Cited

U.S. PATENT DOCUMENTS 5,648,654 A * 7/1997 Possin ...................... 250/208.1

6,704,085 B2 * 3/2004 Nishimura et al. ......... 349/141

FOREIGN PATENT DOCUMENTS

| JP | 2973934 | 9/1999 |
| JP | 2000-81637 | 3/2000 |
| JP | 2000-89240 | 3/2000 |
| KR | 1999-009891 | 2/1999 |
| KR | 2002-0017436 | 3/2002 |

* cited by examiner

*Primary Examiner*—Michael Tran
*Assistant Examiner*—Long Tran
(74) *Attorney, Agent, or Firm*—Scully, Scott, Murphy & Presser

(57) ABSTRACT

An in-plane switching mode active matrix type liquid crystal display device includes a first substrate, a second substrate located opposing the first substrate, and a liquid crystal layer sandwiched between the first and second substrates. The first substrate includes a thin film transistor, a pixel electrode, a common electrode, a data line, a scanning line, and a common electrode line. The scanning line and the common electrode line are formed in a common layer in parallel with each other. The common electrode overlaps the data line and the scanning line with an interlayer insulating film existing therebetween. The common electrode line is singly formed at either side about the scanning line. The common electrode is electrically connected to the common electrode line through a contact hole formed throughout the interlayer insulating film, and shields a gap formed between the scanning line and the common electrode line.

58 Claims, 43 Drawing Sheets

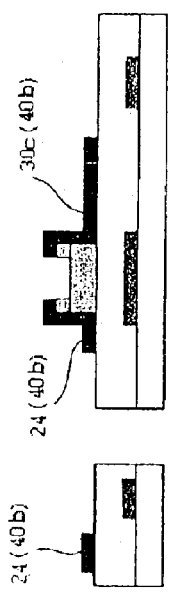
FIG.16D
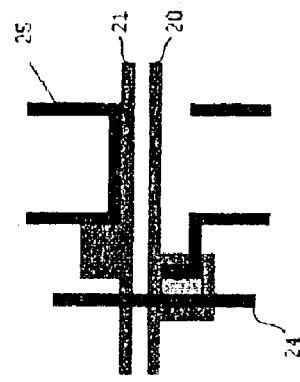
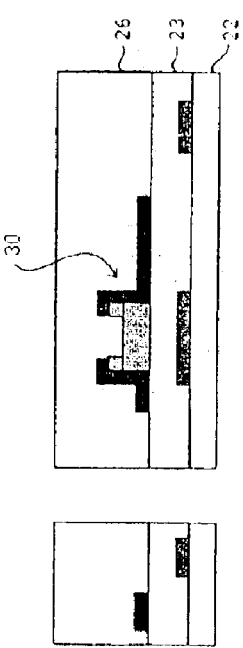
FIG.16E
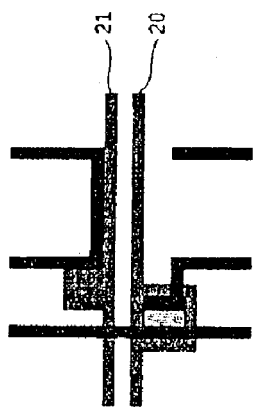
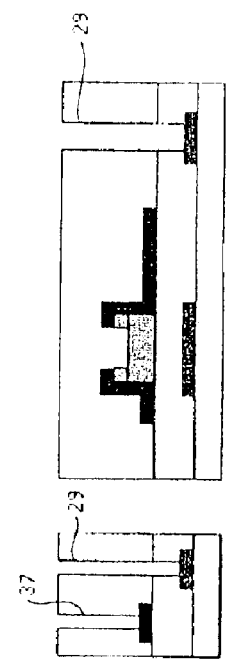
FIG.16F
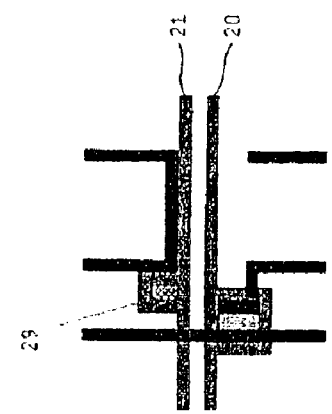

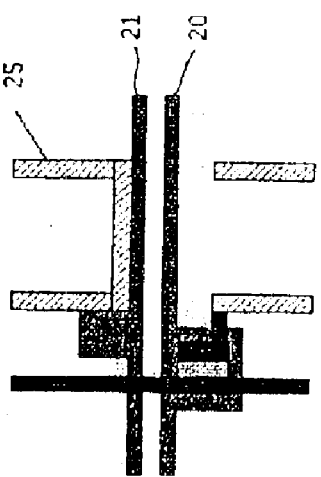
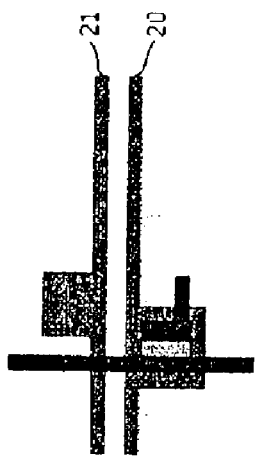
FIG.18D
FIG.18E
FIG.18F

IN-PLANE SWITCHING MODE ACTIVE MATRIX TYPE LIQUID CRYSTAL DISPLAY DEVICE AND METHOD OF FABRICATING THE SAME

BACKGROUND OF THE INVENTION

1. Field of the Invention

The invention relates to a liquid crystal display device and a method of fabricating the same, and more particularly to an in-plane switching mode active matrix type liquid crystal display device and a method of fabricating the same.

2. Description of the Related Art

A liquid crystal display device may be grouped into two types in one of which molecular axes of aligned liquid crystal molecules are rotated in a plane perpendicular to a substrate to display imaged, and in the other of which molecular axes of aligned liquid crystal molecules are rotated in a plane parallel with a substrate to display images.

A typical one in the former type is a twisted nematic (TN) mode liquid crystal display device, and the latter type is called an in-plane switching (IPS) mode liquid crystal display device.

Since a viewer looks an IPS mode liquid crystal display device only in a direction in which minor axes of liquid crystal molecules extend, even if he/she moves his/her eye point, how liquid crystal molecules stand is not dependent on a viewing angle, and accordingly, an IPS liquid crystal display device can present a broader viewing angle to a newer than a TN mode liquid crystal display device.

Hence, an IPS mode liquid crystal display device has been more popular these days than a TN mode liquid crystal display device.

For instance, Japanese Patent Application Publication No. 2000-89240 (Japanese Patent No. 3125872), Japanese Patent Application Publication No. 2000-81637 and Japanese Patent No. 2973934 have suggested an in-plane switching mode liquid crystal display device.

As a typical example of a conventional in-plane switching mode liquid crystal display device, the liquid crystal display device suggested in Japanese Patent Application Publication No. 2000-89240 is illustrated in FIGS. 1 and 2. FIG. 1 is a plan view of the liquid crystal display device, and FIG. 2 is a cross-sectional view taken along the line II—II in FIG. 1.

As illustrated in FIGS. 1 and 2, common electrodes 103 and common electrode lines 105 exist above and overlap scanning lines 101 and data lines 102.

In the conventional liquid crystal display device illustrated in FIGS. 1 and 2, though the common electrodes 103 and the common electrode lines 105 shield the scanning lines 101 and the data lines 012, the common electrodes 103 are formed only on an interlayer insulating film 104, as illustrated in FIG. 2. As a result, the conventional liquid crystal display device illustrated in FIGS. 1 and 2 is accompanied with the following problem.

If the common electrode line 105 is comprised of an electrically conductive transparent film, the common electrode line 105 would have a high wiring resistance, resulting in that a delay occurs in the common electrode line 105, and a crosstalk is also generated in a direction in which the scanning lines 101 extend, in dependence on an image pattern.

On the other hand, if the common electrode line 105 is comprised of an opaque metal film, liquid crystal would make contact with the opaque metal film through an alignment film, and hence, on application of a direct current voltage to the common electrode line 105, the opaque metal makes electrochemical reaction with liquid crystal, and resultingly, is fused into a liquid crystal layer. This causes a spot to be likely to be generated in a display screen.

SUMMARY OF THE INVENTION

In view of the above-mentioned problems in the conventional in-plane switching mode liquid crystal display device, it is an object of the present invention to provide an in-plane switching mode liquid crystal display device which is capable of arranging a low-resistive common electrode line below an interlayer insulating film which is stable to displaying images, and increasing an aperture ratio.

In one aspect of the present invention, there is provided an in-plane switching mode active matrix type liquid crystal display device including (a) a first substrate, (b) a second substrate located opposing the first substrate, and (c) a liquid crystal layer sandwiched between the first and second substrates. The first substrate includes a thin film transistor having a gate electrode, a drain electrode and a source electrode, a pixel electrode each associated to a pixel to be driven, a common electrode to which a reference voltage is applied, a data line, a scanning line, and a common electrode line. The gate electrode is electrically connected to the scanning line, the drain electrode is electrically connected to the data line, the source electrode is electrically connected to the pixel electrode, and the common electrode is electrically connected to the common electrode line. Molecular axes of liquid crystal in the liquid crystal layer are rotated in a plane parallel with the first substrate by an electric field substantially parallel with a plane of the first substrate and to be applied between the pixel electrode and the common electrode, to thereby display images. The scanning line and the common electrode line are formed in a common layer in parallel with each other. The common electrode overlaps the data line and the scanning line with an interlayer insulating film existing therebetween. The common electrode line is singly formed at either side about the scanning line. The common electrode is electrically connected to the common electrode line through a contact hole formed throughout the interlayer insulating film, and shields a gap formed between the scanning line and the common electrode line.

In the in-plane switching mode active matrix type liquid crystal display device in accordance with the present invention, the scanning and data lines are shielded by the common electrode with an interlayer insulating film being sandwiched therebetween. Thus, an electric field leaking out of the scanning and data lines is shielded by the common electrode, and as a result, it would be possible to expand a display area controllable by the pixel electrode and the common electrode. This is accompanied with an advantage that an area the common electrode line occupies can be reduced.

In a conventional in-plane switching mode liquid crystal display device, common electrode lines are arranged at opposite sides about a scanning line in order to shield an electric field leaking out of the scanning line. In contrast, in the in-plane switching mode active matrix type liquid crystal display device in accordance with the present invention, since the, common electrode is designed to have a function of shielding an electric field leaking out of the, scanning line, it is possible to reduce the number of common electrode lines which shield an electric field leaking out of the scanning line, down to one.

In the in-plane switching mode active matrix type liquid crystal display device in accordance with the present invention, the pixel electrode and the common electrode are formed in different layers from each other, ensuring that it is possible to prevent the pixel and common electrodes from short-circuiting with each other.

The common electrode is electrically connected to the common electrode line through a contact hole formed throughout the interlayer insulating film. Hence, it would be possible to reduce a resistance of the common electrode, and hence, reduce defectiveness in displaying images, such as cross-talk caused by signal delay.

Since the common electrode is designed to shield a gap formed between the scanning line and the common electrode line, the common electrode can completely shield a horizontal electric field generated between the scanning line and the common electrode line.

When the present invention is applied to a single domain type liquid crystal display device, it is preferable that the contact hole is formed in the vicinity of one of two corners defining a diagonal line thereacross which is obtained, if a rubbing direction is given, by rotating in a plan view of a pixel by an acute angle in the rubbing direction with respect to a direction in which the data line extends.

By positioning the contact hole in the above-mentioned way, if a reverse-rotation preventing structure is formed at an end of a pixel for keeping alignment stable, an electrode for preventing reverse rotation of the common electrode would be formed at the contact hole. As a result, it would be possible to efficiently arrange the contact hole and the electrode for preventing reverse rotation of the common electrode, ensuring an increase in an aperture ratio.

The active matrix type liquid crystal display device in accordance with the present invention may be designed to include a first sub pixel area to which a first electric field is applied in parallel with a plane of the first substrate between the pixel and common electrodes, and in which the molecular axes of liquid crystal rotate in a first direction in a plane parallel with the first substrate, and a second sub pixel area to which a second electric field is applied in parallel with a plane of the first substrate between the pixel and common electrodes, and in which the molecular axes of liquid crystal rotate in a second direction in a plane parallel with the first substrate, the second direction being different from the first direction.

In other words, the present invention may be applied not only to a single domain type liquid crystal display device, but also to a multi-domain type liquid crystal display device.

When the present invention is applied to a multi-domain type liquid crystal display device, it is preferable that the contact hole is formed at any one of corners at which an extension of the scanning line and an extension of the common electrode form an angle of 90 degrees or greater in a plan view of a pixel.

It would be possible to increase an aperture ratio by positioning the contact hole in the above-mentioned way.

It is preferable that the common electrode extends beyond the data line by at least 3 micrometers in a width-wise direction thereof.

It is preferable that the common electrode extends beyond the scanning line by at least 1 micrometer in a width-wise direction thereof.

It is preferable that the common electrode is formed in a layer closer to the liquid crystal layer than the pixel electrode, and the common and pixel electrodes are electrically insulated from each other by an interlayer insulating film.

It is preferable that the pixel electrode and the data line are formed in a common layer.

By forming the pixel electrode and the data line in a common layer, it would be possible to form them in a common pattern, preventing an increase in the number of fabrication steps.

It is preferable that the pixel electrode is comprised of a plurality of first portions, and a second portion connecting the first portions at ends thereof to one another, and the second portion is located above the common electrode line and cooperates with the common electrode line to form an accumulation capacity therebetween.

It is preferable that the second portion is remote from a scanning line in a next stage by 3 micrometers or greater.

It is preferable that the common electrode is formed in a layer closer to the liquid crystal layer than the pixel electrode, and the common and pixel electrodes cooperate with each other to form an accumulation capacity therebetween.

It is preferable that the common electrode and/or the pixel electrode are(is) composed of electrically conductive transparent material such as indium tin oxide (ITO).

The use of electrically conductive transparent material would increase an aperture ratio.

The interlayer insulating film may be comprised of a film composed of organic material, a film composed of transparent inorganic material, or a film having a two-layered structure including a film composed of organic material and a film composed of transparent inorganic material.

It is preferable that the interlayer insulating film is comprised of an organic film and an inorganic film, and the organic film is formed above and in the vicinity of the scanning line, the data line, the common electrode line and the thin film transistor.

It is preferable that the interlayer insulating film is comprised of an organic film and an inorganic film, and the organic film is formed above and in the vicinity of the scanning line, the data line and the thin film transistor.

It is preferable that the interlayer insulating film is comprised of an organic film and an inorganic film, and the organic film is formed above and in the vicinity of the data line and the thin film transistor.

It is preferable that the interlayer insulating film is comprised of an organic film and an inorganic film, and the organic film is formed above and in the vicinity of the data line.

It is preferable that the above-mentioned organic film is formed only inside of a pattern of the common electrode.

This ensures reduction in a capacity formed between wiring layers and enhancement in display quality without reduction in an intensity of a horizontal electric field which reduction is caused by the organic film.

It is preferable that the organic material is photosensitive resin.

It is preferable that the thin film transistor is formed at an intersection of the scanning and data lines, and the drain electrode is formed directly of the data line.

Thus, it is no longer necessary to form an electrode extended from a drain electrode, which was necessarily formed in a conventional in-plane switching mode liquid crystal display device. This ensures that an area a thin film transistor in a pixel occupies is minimized. In addition, it is possible to increase an aperture ratio to a degree corresponding to an area of the above-mentioned electrode which is no longer necessary to be formed in the present invention.

The in-plane switching mode active matrix type liquid crystal display may further include a black matrix layer formed in a matrix, in which case, it is preferable that the black matrix layer is formed in an isolated pattern only above the thin film transistor for overlapping the thin film transistor.

Since the black matrix layer is formed in a minimum area, it would be possible to increase an aperture ratio.

It is preferable that the black matrix layer has a specific resistance of $1 \times 10^{10}$ Ω·cm or greater.

The in-plane switching mode active matrix type liquid crystal display device may further include a color layer defining a color filter, the color layer having an edge extending in parallel with the data line.

It would be possible to prevent an increase in unnecessary light-shielded area by forming a color layer to have an edge extending in parallel with the data line. This ensures an increase in an aperture ratio.

It is preferable that the color layers are arranged in such a manner that adjacent color layers are arranged without a gap therebetween or partially overlap each other.

If there is a gap between adjacent color layers, there is caused a problem that when a monotone color is to be displayed, white is mixed with a certain color, and accordingly, a range of color which can be displayed is narrowed. In addition, if a user obliquely watches a liquid crystal panel, displayed colors may be shifted in an oblique viewing angle, because a light having passed through a certain pixel is observed as if it comes from an adjacent pixel. These problems can be solved by arranging adjacent color layers without a gap therebetween or by arranging adjacent color layers such that they overlap each other.

The in-plane switching mode active matrix type liquid crystal display device may further include a pillar-shaped pattern formed between the scanning line and the common electrode line for ensuring a gap between the first and second substrates.

Since a pillar-shaped pattern having a uniform height can be formed more readily than spacers having a uniform diameter, it would become easier to keep a gap between the first and second substrates constant by using the pillar-shaped pattern.

The pillar-shaped pattern may be formed on either the first substrate or the second substrate, or on both of the first and second substrates.

It is preferable that liquid crystal in the liquid crystal layer has dielectric constant anisotropy $\Delta \in$ of 9 or greater.

It is preferable that liquid crystal in the liquid crystal layer has dielectric constant anisotropy $\Delta \in$ of 11 or greater.

It is preferable that liquid crystal in the liquid crystal layer has an N/I point of 80 degrees centigrade or higher.

It is preferable that the common electrode is formed above a channel of the thin film transistor with an opening having an end remote from an end of the channel by a predetermined distance.

The opening causes the thin film transistor not to be shielded by the common electrode. As a result, it is possible to prevent characteristics of the thin film transistor from being shifted due to variance in a voltage of the common electrode. In particular, when the liquid crystal display device is driven in accordance with a gate line inversion process, it would be quite beneficial to form the common electrode with the above-mentioned opening, because a voltage of the common electrode significantly varies.

The in-plane switching mode active matrix type liquid crystal display device may be designed to further include a reverse-rotation preventing structure in a sub pixel area in which all liquid crystal molecules are rotated in the same direction, for preventing liquid crystal molecules from rotating in a direction opposite to the same direction. The reverse-rotation preventing structure includes an auxiliary electrode to which a voltage equal to a voltage of at least one of the pixel electrode and the common electrode is applied such that a direction of a rubbing axis is identical in the sub pixel area with a direction of an electric field generated in the sub pixel area, if the rubbing axis rotates by an acute angle.

The reverse-rotation preventing structure prevents liquid crystal from rotating in the opposite direction. In other words, the reverse-rotation preventing structure keeps liquid crystal twisted in a fixed direction, ensuring enhanced reliability in displaying images.

It is preferable that the data line is electrically connected around a display area to a first protection circuit formed in the same layer as a layer in which the scanning line is formed, through a contact hole formed throughout an electrically insulating film, and the scanning line is electrically connected around a display area to a second protection circuit formed in the same layer as a layer in which the data line is formed, through a contact hole formed throughout the electrically insulating film.

It is preferable that the data line is electrically connected around a display area to a first protection circuit formed in the same layer as a layer in which the scanning line is formed, through a contact hole formed throughout an electrically insulating film and further through an electrically conductive pattern formed on a layer formed on the electrically insulating film, and the scanning line is electrically connected around a display area to a second protection circuit formed in the same layer as a layer in which the data line is formed, through a contact hole formed throughout the electrically insulating film and further through an electrically conductive pattern formed on a layer formed on the electrically insulating film.

The above-mentioned in-plane switching mode active matrix type liquid crystal display device in accordance with the present invention may be applied various electronic devices such as a portable communication device or a cellular phone.

By designing a liquid crystal panel in electronic devices to include the in-plane switching mode active matrix type liquid crystal display device in accordance with the present invention, an aperture ratio can be enhanced in a display screen, ensuring enhancement of brightness in the display screen.

In another aspect of the present invention, there is provided a method of fabricating an in-plane switching mode active matrix type liquid crystal display device including (a) a first substrate, (b) a second substrate located opposing the first substrate, and (c) a liquid crystal layer sandwiched between the first and-second substrates wherein the first substrate includes (a1) a thin film transistor having a gate electrode, a drain electrode and a source electrode, (a2) a pixel electrode each associated to a pixel to be driven, (a3) a common electrode to which a reference voltage is applied, (a4) a data line, (a5) a scanning line, and (a6) a common electrode line, the gate electrode is electrically connected to the scanning line, the drain electrode is electrically connected to the data line, the source electrode is electrically connected to the pixel electrode, and the common electrode is electrically connected to the common electrode line, and molecular axes of liquid crystal in the liquid crystal layer are rotated in a plane parallel with the first substrate by an electric field substantially parallel with a plane of the first substrate and to be applied between the pixel electrode and the common electrode, to thereby display images. The method including the steps of (a) forming the scanning line and the common electrode line in a common layer in parallel with each other wherein the common electrode line is singly formed at either side about the scanning line, (b) forming an interlayer insulating film over the data line and the scanning line, (c) forming a contact hole throughout the interlayer insulating film, and (d) forming the common electrode on the interlayer insulating film such that the common electrode is electrically connected to the common electrode line through the contact hole and the common electrode shields a gap formed between the scanning line and the common electrode line.

The method may further include the step of forming the pixel electrode and the data line in a common layer.

The method may further include the step of forming the pixel electrode comprised of a plurality of first portions, and a second portion connecting the first portions at ends thereof to one another, wherein the second portion is located above the common electrode line and cooperates with the common electrode line to form an accumulation capacity therebetween.

The method may further include the step of forming the interlayer insulating film so as to have a two-layered structure including an organic film and an inorganic film.

The method may further include the step of forming the interlayer insulating film so as to have a two-layered structure including an organic film and an inorganic film wherein and the organic film is formed above and in the vicinity of the scanning line, the data line, the common electrode line and the thin film transistor.

The method may further include the step of forming the interlayer insulating film so as to have a two-layered structure including an organic film and an inorganic film wherein and the organic film is formed above and in the vicinity of the scanning line, the data line and the thin film transistor.

The method may further include the step of forming the interlayer insulating film so as to have a two-layered structure including an organic film and an inorganic film wherein and the organic film is formed above and in the vicinity of the data line and the thin film transistor.

The method may further include the step of forming the interlayer insulating film so as to have a two-layered structure including an organic film and an inorganic film wherein and the organic film is formed above and in the vicinity of the data line.

The method may further include the step of forming a black matrix layer in an isolated pattern only above the thin film transistor for overlapping the thin film transistor.

The method may further include the step of forming a color layer defining a color filter such that the color layer has an edge extending in parallel with the data line.

The method may further include the step of forming color layers defining a color filter such that the color layers are arranged in such a manner that adjacent color layers are arranged without a gap therebetween or partially overlap each other.

The method may further include the step of forming a pillar-shaped pattern on at least one of the first and second substrates between the scanning line and the common electrode line for ensuring a gap between the first and second substrates.

The method may further include the step of forming the common electrode above a channel of the thin film transistor with an opening having an end remote from an end of the channel by a predetermined distance.

The method may further include the step of electrically connecting the data line around a display area to a first protection circuit formed in the same layer as a layer in which the scanning line is formed, through a contact hole formed throughout an electrically insulating film, and further electrically connecting the scanning line around a display area to a second protection circuit formed in the same layer as a layer in which the data line is formed, through a contact hole formed throughout the electrically insulating film.

The method may further include the step of electrically connecting the data line around a display area to a first protection circuit formed in the same layer as a layer in which the scanning line is formed, through a contact hole formed throughout an electrically insulating film and further through an electrically conductive pattern formed on a layer formed on the electrically insulating film, and further electrically connecting the scanning line around a display area to a second protection circuit formed in the same layer as a layer in which the data line is formed, through a contact hole formed throughout the electrically insulating film and further through an electrically conductive pattern formed on a layer formed on the electrically insulating film.

The advantages obtained by the aforementioned present invention will be described hereinbelow.

In the in-plane switching mode active matrix type liquid crystal display device in accordance with the present invention, the scanning line and the common electrode line are formed in a common layer in parallel with each other, and the scanning and data lines are shielded by the common electrode with an interlayer insulating film being sandwiched therebetween. The common electrode line is singly formed at either side about the scanning line.

Since the scanning and data lines are shielded by the common electrode, an electric field leaking out of the scanning and data lines is shielded by the common electrode, and as a result, it would be possible to expand a display area controllable by the pixel electrode and the common electrode.

This is accompanied with an advantage that an area the common electrode line occupies can be reduced. In a conventional in-plane switching mode liquid crystal display device, common electrode lines are arranged at opposite sides about a scanning line in order to shield an electric field leaking out of the scanning line. In contrast, in in-plane switching mode active matrix type liquid crystal display device in accordance with the present invention, since the common electrode is designed to have a function of shielding an electric field leaking out of the scanning line, it is possible to reduce the number of common electrode lines which shield an electric field leaking out of the scanning line, down to one.

In in-plane switching mode active matrix type liquid crystal display device in accordance with the present invention, the pixel electrode and the common electrode are formed in different layers from each other, ensuring that it is possible to prevent the pixel and common electrodes from short-circuiting with each other. As a result, it is possible to increase a yield at which the liquid crystal display device is fabricated.

The number of fabrications steps to be carried out for forming the pixel electrode and the common electrode in different layers from each other is not increased in comparison with the number of fabrications steps to be carried out for forming the pixel electrode and the common electrode in a common layer like a conventional in-plane switching mode liquid crystal display device.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 16A to 16G are cross-sectional views of the liquid crystal display device in accordance with the first embodiment of the present invention, illustrating respective steps of a method of fabricating the same.

FIGS. 18A to 18I are cross-sectional views of the liquid crystal display device in accordance with the second embodiment of the present invention, illustrating respective steps of a method of fabricating the same.

DESCRIPTION OF THE PREFERRED EMBODIMENTS

Preferred embodiments in accordance with the present invention will be explained hereinbelow with reference to drawings.

[First Embodiment]

Figure 3:
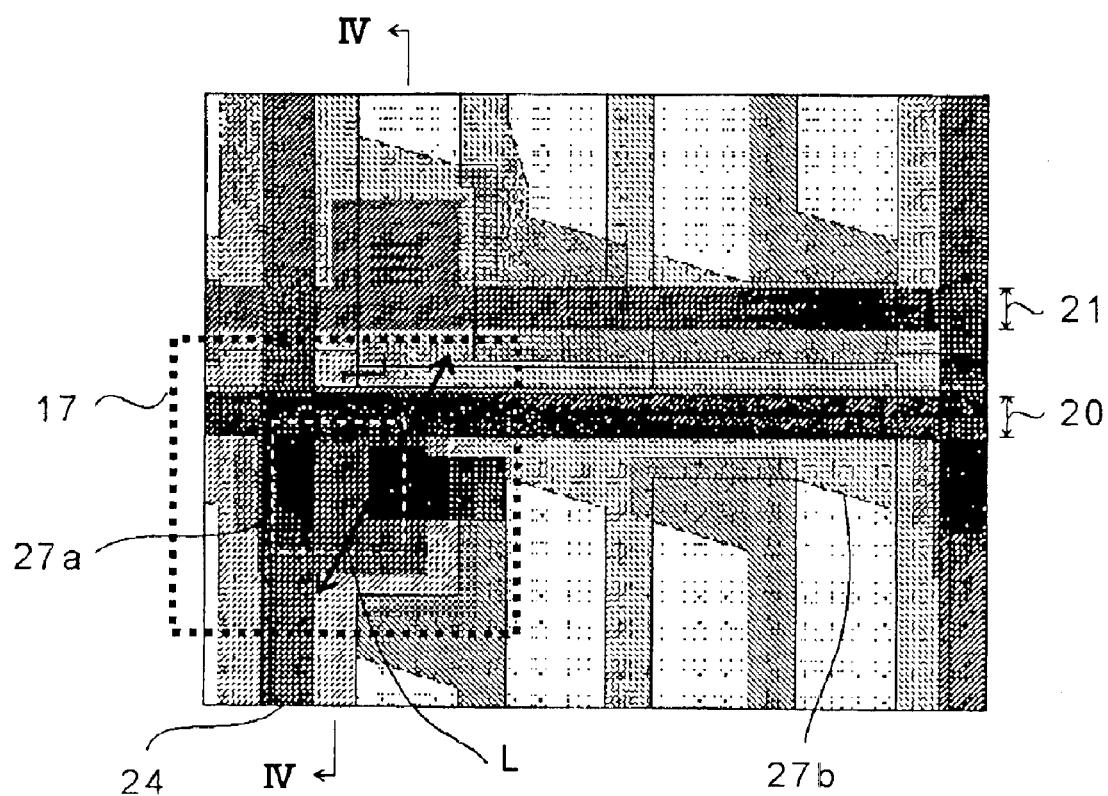
FIG. 3 is a plan view of an in-plane switching mode active matrix type liquid crystal display device in accordance with the first embodiment of the present invention.
Figure 4:
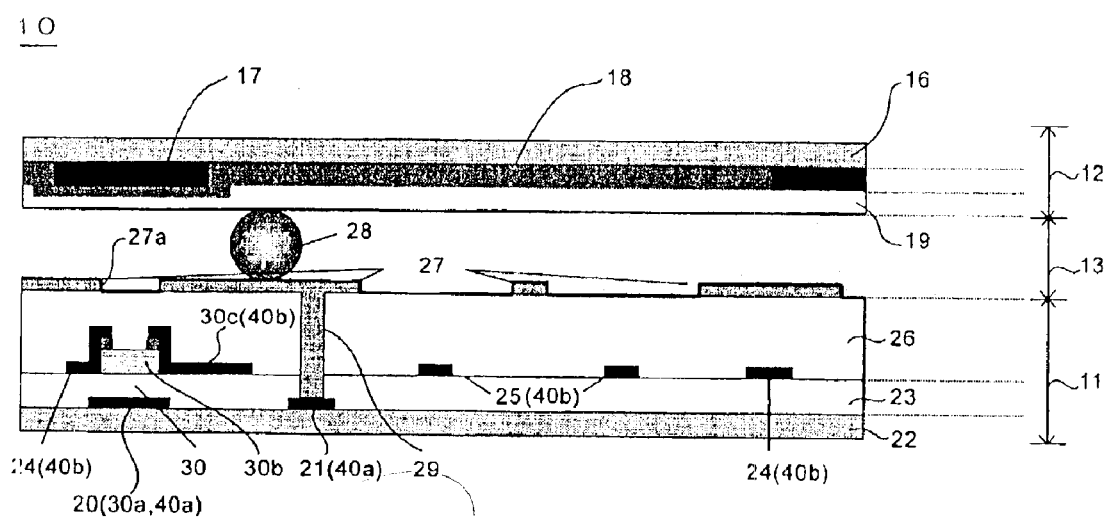
FIG. 4 is a cross-sectional view taken along the line IV—IV in FIG. 3.
Figure 5:
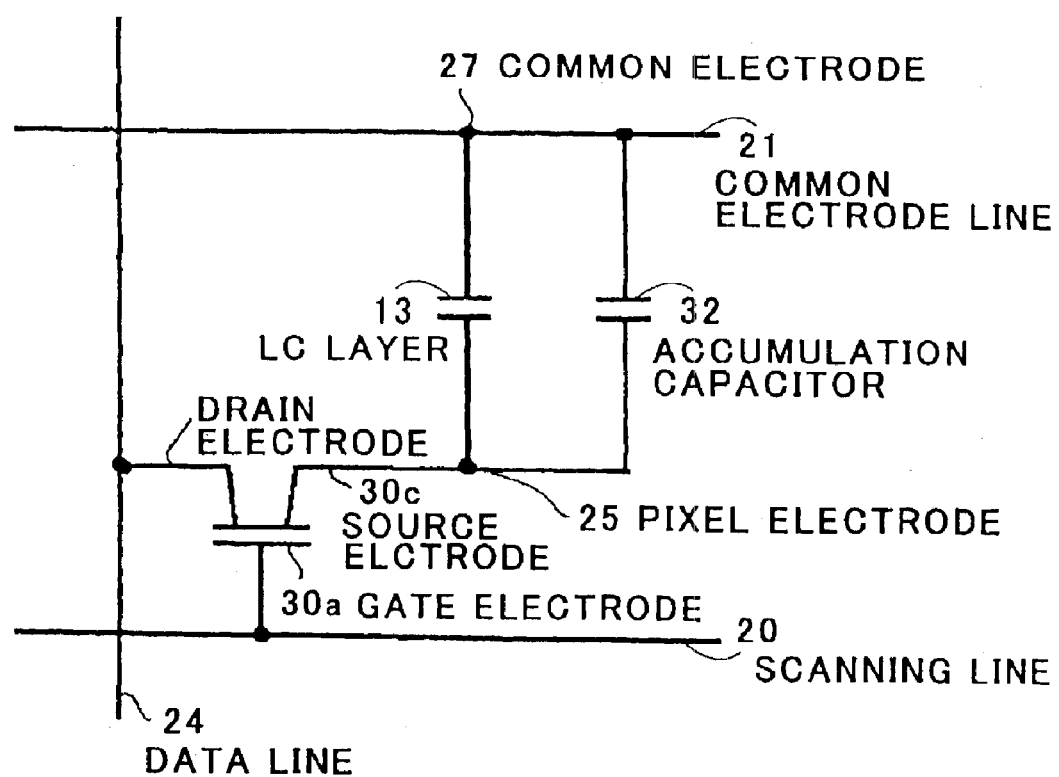
FIG. 5 is a circuit diagram of the liquid crystal display device in accordance with the first embodiment of the present invention.

FIGS. 3, 4 and 5 illustrate an in-plane switching mode active matrix type liquid crystal display device in accordance with the first embodiment of the present invention. FIG. 3 is a plan view of an active matrix type liquid crystal display device 10 in accordance with the first embodiment, FIG. 4 is a cross-sectional view taken along the line IV—IV in FIG. 3, and FIG. 5 is a circuit diagram of a pixel of the liquid crystal display device 10 illustrated in FIG. 3.

As illustrated in FIG. 4, the liquid crystal display device 10 is comprised of an active device substrate 11, an opposing substrate 12, and a liquid crystal layer 13 sandwiched between the active device substrate 11 and the opposing substrate 12.

The opposing substrate 12 is comprised of an electrically insulating transparent substrate 16, a black matrix layer 17 formed on the electrically insulating transparent substrate 16 in a matrix as a light-shielding film, a color layer 18 formed on the electrically insulating transparent substrate 16 such that it partially overlaps the black matrix layer 17, and a transparent over-coating layer 19 covering the black matrix layer 17 and the color layer 18 therewith.

The opposing substrate 12 further includes an electrically conductive transparent layer (not illustrated) on an upper surface of the electrically insulating transparent substrate 16 in order to prevent electric charges caused by contact of a liquid crystal display panel with other materials, from exerting electrical influence on the liquid crystal layer 13.

The color layer 18 is comprised of resin films containing red (R), green (G) and blue (B) pigments therein.

The active device substrate 11 is comprised of an electrically insulating transparent substrate 22, a first metal layer 40a formed on the electrically insulating transparent substrate 22, and defining a gate electrode 30a (see FIG. 5) and a common electrode line 21, a gate insulating film 23 formed on the electrically insulating transparent substrate 22, covering the first metal layer 40a therewith, an island-shaped amorphous silicon film 30b formed on the gate insulating film 23, a second metal layer 40b formed on the gate insulating film 23 and defining a data line 24, a source electrode 30c and a pixel electrode 25, an interlayer insulating film 26 formed on the gate insulating film 23, covering the second metal film 40b therewith, and a common electrode 27 formed on the interlayer insulating film 26 and composed of transparent material.

The island-shaped amorphous silicon film 30b, the data line 24 and the source electrode 30b cooperate with one another to thereby define a thin film transistor (TFT) 30.

In the specification, a layer located closer to the liquid crystal layer 13 is called an "upper" layer and a layer located remoter from the liquid crystal layer 13 is called a "lower" layer in both the active device substrate 11 and the opposing substrate 12.

The active device substrate 11 and the opposing substrate 12 include alignment films (not illustrated), respectively, both making contact with the liquid crystal layer 13. The alignment films are rubbed such that the liquid crystal layer 13 is homogeneously aligned in a direction L inclined from a direction in which the common electrode 27 and the pixel electrode 25 extend, by an angle in the range of 10 to 30 degrees, and then, adhered to the active device substrate 11 and the opposing substrate 12, respectively, such that they face each other. The above-mentioned angle is called initial alignment orientation of liquid crystal molecules.

The active device substrate 11 includes a polarizing plate (not illustrated) adhered to a lower surface of the electrically insulating transparent substrate 22, and similarly, the opposing substrate 12 includes a polarizing plate (not illustrated) adhered to the above-mentioned electrically conductive layer formed on the electrically insulating transparent substrate 16. The polarizing plate of the active device substrate 11 is designed to have a polarizing axis perpendicular to a rubbing axis, and the polarizing plate of the opposing substrate 12 is designed to have a polarizing axis parallel with the rubbing axis. That is, the polarizing axes of the polarizing plates are perpendicular to each other.

Spacers 28 (only one of them is illustrated in FIG. 4) are sandwiched between the active device substrate 11 and the opposing substrate 12 to ensure a thickness of the liquid crystal layer 13, and a seal (not illustrated) is formed around the liquid crystal layer 13 between the active device substrate 11 and the opposing substrate 12 for avoiding leakage of liquid crystal molecules.

A data signal is transmitted to the data line 24, a reference voltage is applied to the common electrode line 21 and the common electrode 27, and a scanning signal is transmitted to the scanning line 20.

As illustrated in FIG. 3, the thin film transistor 30 is fabricated for each of pixels at each of intersections at which the scanning line 20 intersects with the data line 24. That is, the thin film transistor 30 is designed to make direct electrical contact with the data line 24.

Figure 1:
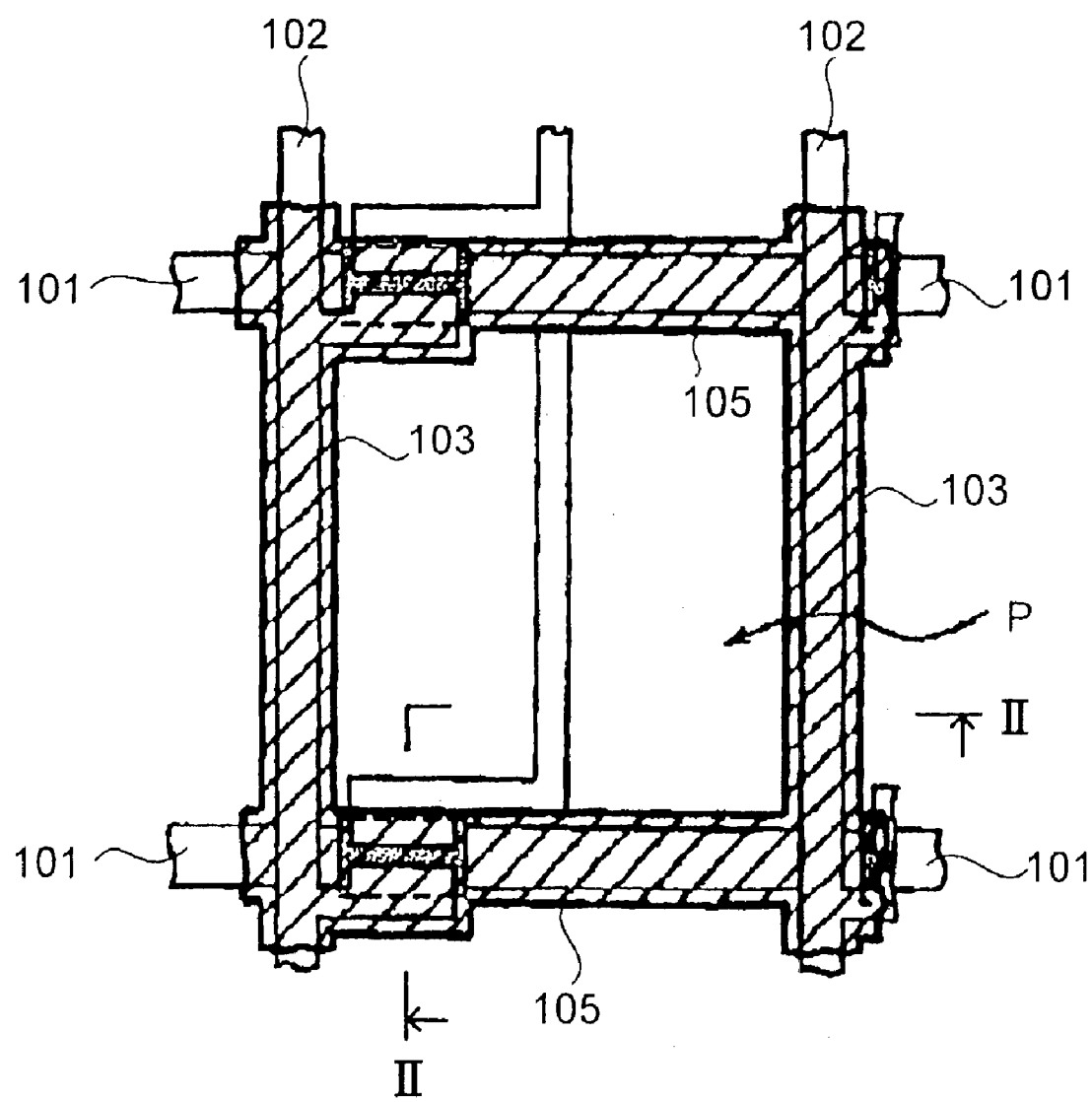
FIG. 1 is a plan view of a conventional in-plane switching mode liquid crystal display device.
Figure 2:
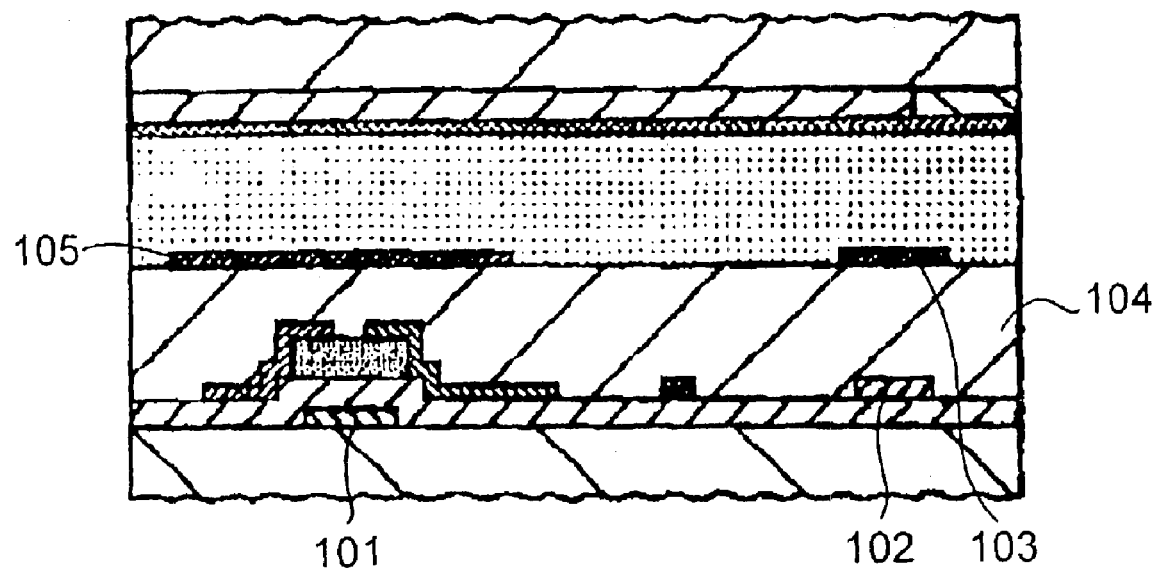
FIG. 2 is a cross-sectional view taken along the line II—II in FIG. 1.

Specifically, the conventional in-plane switching mode liquid crystal display device illustrated in FIG. 1 was designed to include a drain electrode comprised of an electrode extended from a data line. In contrast, the liquid crystal display device 10 in accordance with the first embodiment makes it no longer necessary to form such an electrode, because the thin film transistor 30 is designed to make direct electrical contact with the data line 24.

The gate electrode 30a, the drain electrode and the source electrode 30a are electrically connected to the scanning line 20, the data line 24 and the pixel electrode 25, respectively.

The liquid crystal display device 10 in accordance with the first embodiment may be designed to include a protection circuit to protect the data line 24 and the scanning line 20.

Figure 6:
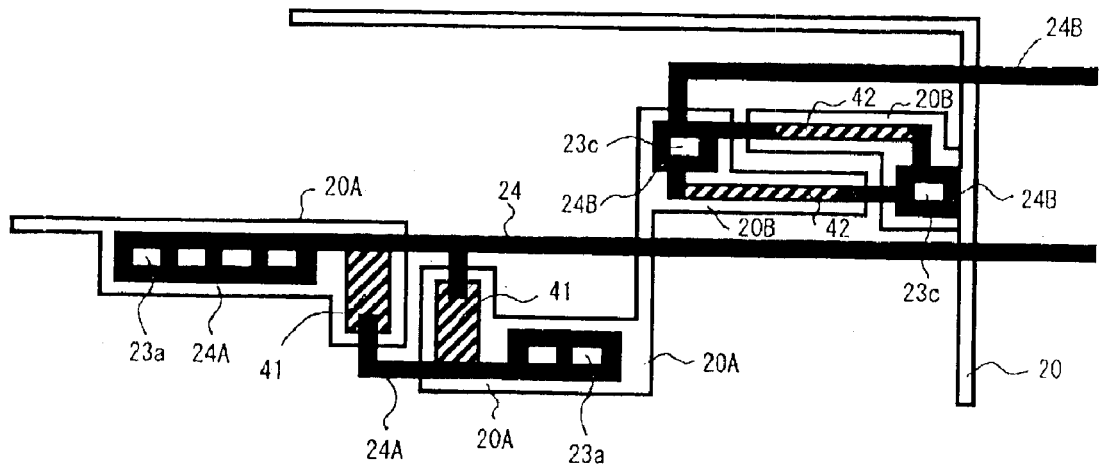
FIG. 6 is a plan view of a first example of a protection circuit.

FIG. 6 is a plan view of a first example of the protection circuit.

The data line 24 is electrically connected around a display screen to a protection circuit 41 through a protection circuit wiring 24A formed in the same layer as a layer in which the data line 24 is formed, a contact hole 23a formed throughout the gate insulating film 23 and a protection circuit wiring 20A formed in the same layer as a layer in which the scanning line 20 is formed.

Similarly, the scanning line 20 is electrically connected around a display screen to a protection circuit 42 through a protection circuit wiring 20B formed in the same layer as a layer in which the scanning line 20 is formed, a contact hole 23c formed throughout the gate insulating film 23 and a protection circuit wiring 24B formed in the same layer as a layer in which the data line 24 is formed.

Figure 7:
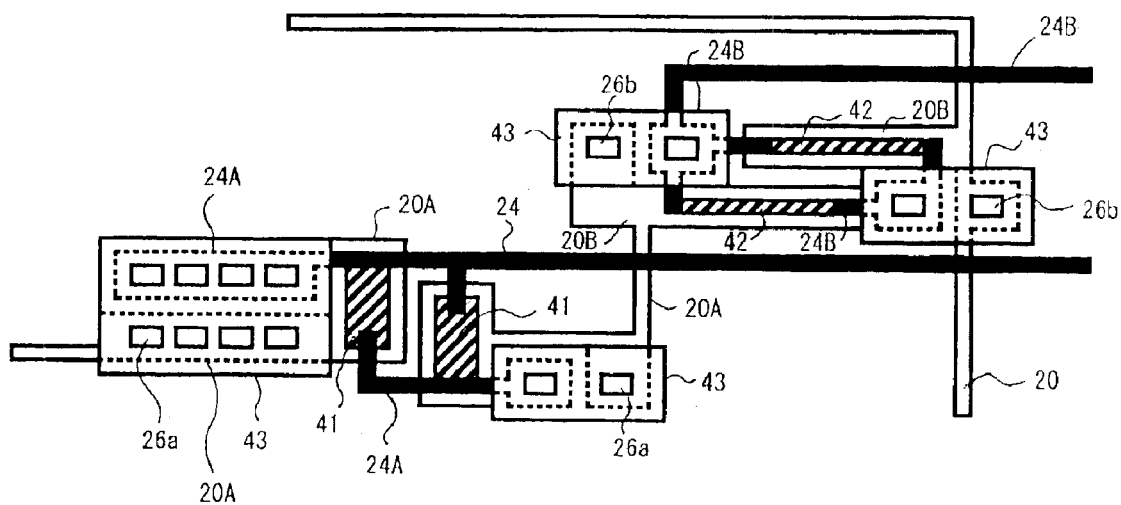
FIG. 7 is a plan view of a second example of a protection circuit.

FIG. 7 is a plan view of a second example of the protection circuit.

The data line 24 is electrically connected around a display screen to the protection circuit 41 through the protection circuit wiring 24A formed in the same layer as a layer in which the data line 24 is formed, a contact hole 26a formed throughout the interlayer insulating film 26, an electrically conductive pattern 43 formed on the interlayer insulating film 26 and the protection circuit wiring 20A formed in the same layer as a layer in which the scanning line 20 is formed.

Similarly, the scanning line 20 is electrically connected around a display screen to the protection circuit 42 through the protection circuit wiring 20B formed in the same layer as a layer in which the scanning line 20 is formed, a contact hole 26b formed throughout the interlayer insulating film 26, an electrically conductive pattern 43 formed on the interlayer insulating film 26 and the protection circuit wiring 24B formed in the same layer as a layer in which the data line 24 is formed.

The protection circuits 41 and 42 provide an advantage that even if an abnormal voltage is applied to the scanning line 20 or the data line 24, the protection circuits 41 and 42 allow such an abnormal voltage to escape therethrough, resulting in that a voltage at the scanning line 20 or the data line 24 is kept stable.

In the in-plane switching mode active matrix type liquid crystal display device 10 in accordance with the first embodiment, as illustrated in FIGS. 3 and 4, the scanning line 20 and the common electrode line 21 are formed in a common layer in parallel with each other on the electrically insulating transparent substrate 22.

The common electrode line 21 is singly formed at a side about the scanning line 20, as illustrated in FIG. 4.

The common electrode 27 overlaps the data line 24 and the scanning line 20 with the gate insulating film 23 and the interlayer insulating film 26 being sandwiched therebetween, and shields a gap formed between the scanning line 20 and the common electrode line 21.

As illustrated in FIG. 3, the common electrode 27 is formed above a channel of the thin film transistor 30 with an opening 27a (an area surrounded with a broken line) through which the channel is exposed. The opening 27a has an end located internally of the channel and remote from an end of the channel by a predetermined distance. That is, the opening 27a is analogous to the channel of the thin film transistor 30.

As illustrated in FIGS. 3 and 4, the opening 27a of the common electrode 27 is covered with the black matrix layer 17 (an area surrounded with a broken line), when viewed from upward.

As illustrated in FIG. 3, the black matrix layer 17 is formed above the thin film transistor 30 to such a degree that the black matrix layer 17 shields the thin film transistor 30. That is, the black matrix layer 17 has a minimum area necessary for preventing a light from entering the thin film transistor 30. In addition, the black matrix layer 17 does not shield the scanning line 20 and the data line 24, and hence, is formed only above the thin film transistor 30 as an isolated pattern.

A contact hole 29 is formed throughout the gate insulating film 23 and the interlayer insulating film 26. The contact hole 29 is filled with electrically conductive material. The common electrode 27 makes electrical contact with the common electrode line 21 through the electrically conductive material filling the contact hole 29 therewith.

Each of the color layers 18 is designed to have an edge extending in parallel with the data line 24.

Figure 8:
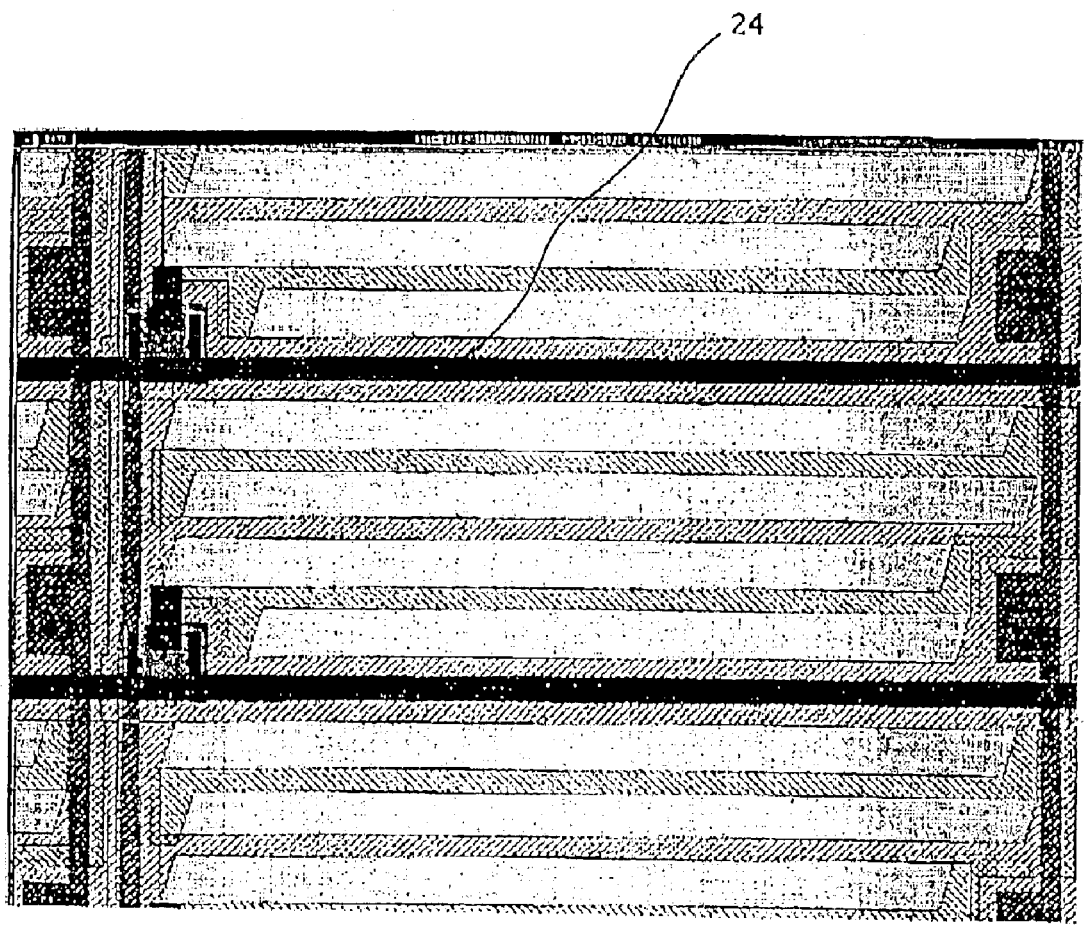
FIG. 8 is a plan view of a first example of a shape of the data line.
Figure 9:
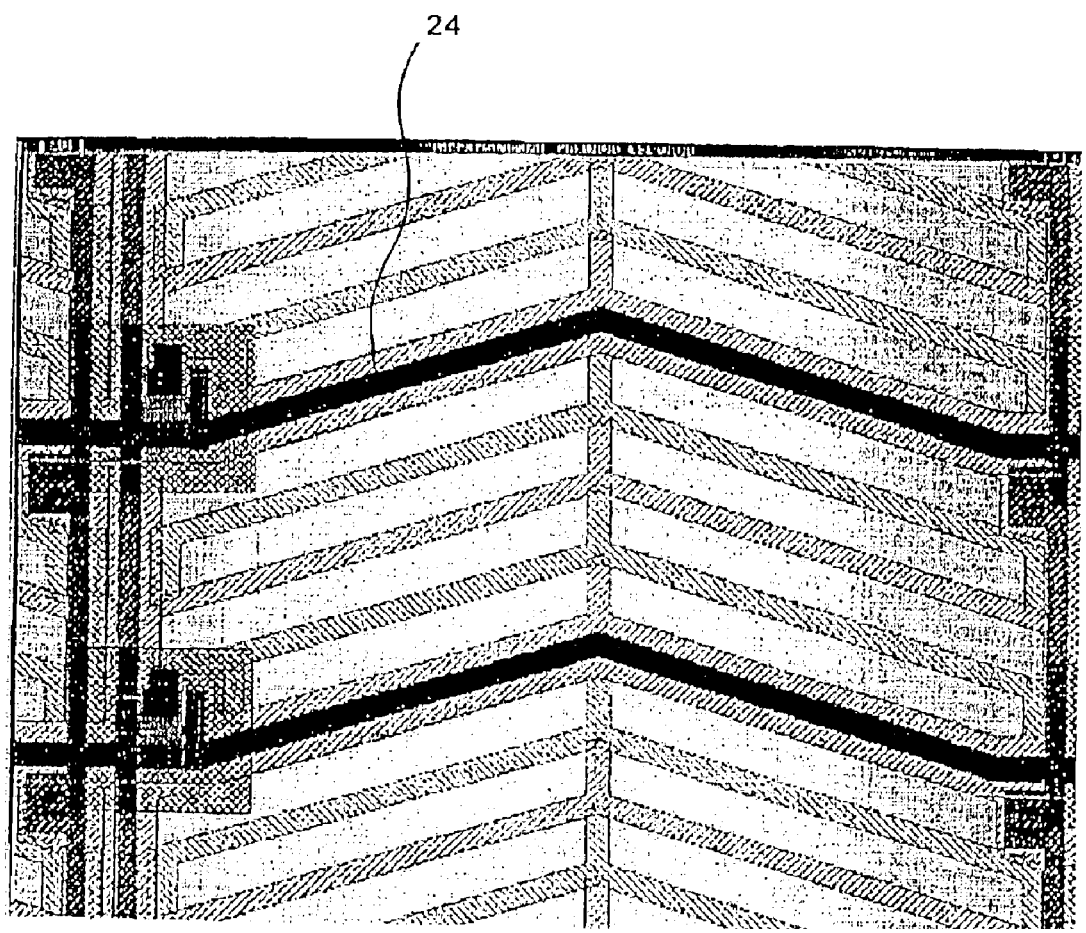
FIG. 9 is a plan view of a second example of a shape of the data line.

As illustrated in FIG. 8, the data line 24 may be designed as a straight line. As an alternative, as illustrated in FIG. 9, the data line 24 may be designed as a zigzag line. In both cases, an edge of the color layer 18 is designed to extend in parallel with the data line 24.

The common electrode 27 is composed of ITO (Indium Tin Oxide) as one of electrically conductive transparent materials.

In the in-plane switching mode active matrix type liquid crystal display device 10 in accordance with the first embodiment, an electric field is generated in parallel with the electrically insulating substrates 16 and 22 between the common electrode 27 and the pixel electrode 25 in a pixel which is selected by a scanning signal transmitted through the scanning line 20 and into which a data signal is introduced through the data line 24. Alignment direction of liquid crystal molecules is rotated in a plane parallel with the electrically insulating substrates 16 and 22 in accordance with the thus generated electric field, thereby images are displayed.

The in-plane switching mode active matrix type liquid crystal display device 10 in accordance with the first embodiment provides the following advantages.

In the in-plane switching mode active matrix type liquid crystal display device 10 in accordance with the first embodiment, the scanning and data lines 20 and 24 are shielded by the common electrode 27 with an interlayer insulating film 26 being sandwiched therebetween. Thus, an electric field leaking out of the scanning and data lines 20 and 24 is shielded by the common electrode 27, and as a result, it would be possible to expand a display area controllable by the pixel electrode 25 and the common electrode 27.

The common electrode 27 is electrically connected to the common electrode line 21 through the contact hole 29 formed throughout the interlayer insulating film 26. Hence, it would be possible to reduce a resistance of the common electrode 27, and hence, reduce defectiveness in displaying images, such as cross-talk caused by signal delay.

Since an electric field leaking out of the scanning and data lines 20 and 24 can be shielded by the common electrode 27 as mentioned above, an area the common electrode line 21 occupies can be reduced.

In the conventional in-plane switching mode liquid crystal display device, the common electrode lines 105 are to be arranged at opposite sides about the scanning line 101 in order to shield an electric field leaking out of the scanning line 101. In contrast, in the in-plane switching mode active matrix type liquid crystal display device 10 in accordance with the first embodiment, since the common electrode 27 is designed to have a function of shielding an electric field leaking out of the scanning line 20, it is possible to reduce the number of the common electrode lines 21 which shield an electric field leaking out of the scanning line 20, down to one. Moreover, for the space between the common electrode line 21 and the scanning line 20 is also shielded by the common electrode 27, the shield layer on the opposing substrate for shielding the light leakage for this space is not necessary. Thus, the aperture ratio can be made higher.

In the in-plane switching mode active matrix type liquid crystal display device 10 in accordance with the first embodiment, the pixel electrode 25 and the common electrode 27 are formed in different layers from each other, ensuring that it is possible to prevent the pixel and common electrodes 25 and 27 from short-circuiting with each other, and hence, it is also possible to increase a yield at which the liquid crystal display device 10 is fabricated.

Since the common electrode 27 is composed of indium tin oxide (ITO), an electrically conductive transparent material, in the liquid crystal display device 10 in accordance with the first embodiment, it is possible to increase an aperture ratio.

In the liquid crystal display device 10 in accordance with the first embodiment, the thin film transistor 30 is designed to make direct electrical contact with the data line 24. Thus, it is no longer necessary to form an electrode extended from a drain electrode, which was necessarily formed in the conventional in-plane switching mode liquid crystal display device illustrated in FIG. 1. This ensures that an area the thin film transistor 30 in a pixel occupies is minimized. In addition, it is possible to increase an aperture ratio to a degree corresponding to an area of the above-mentioned electrode which is no longer necessary to be formed in the liquid crystal display device 10.

In the liquid crystal display device 10 in accordance with the first embodiment, as illustrated in FIG. 3, the black matrix layer 17 is formed only above the thin film transistor 30 to such a degree that the black matrix layer 17 shields the thin film transistor 30. That is, the black matrix layer 17 is designed to have a minimum area necessary for preventing a light from entering the thin film transistor 30, ensuring an increase in an aperture ratio.

The color layers 18 are arranged in such a manner that adjacent color layers are arranged without a gap therebetween or partially overlap each other. This ensures that a range of color which can be displayed is prevented from being narrowed, and hence, display quality can be enhanced.

In the liquid crystal display device 10 in accordance with the first embodiment, each of the color layers 18 is designed to have an edge extending in parallel with the data line 24, preventing an increase in unnecessary light-shielding area and increasing an aperture ratio.

In the liquid crystal display device 10 in accordance with the first embodiment, the common electrode 27 is formed above the thin film transistor 30 such that the common electrode 27 overlaps the thin film transistor 30. This ensures that the common electrode 27 prevents a horizontal electric field from leaking out of the thin film transistor 30.

As illustrated in FIG. 3, the common electrode 27 is formed above a channel of the thin film transistor 30 with the opening 27a through which the channel is exposed. The common electrode 27 minimizes leakage of a horizontal electric field out of the thin film transistor 30, and it is possible to prevent characteristics of the thin film transistor 30 from being shifted due to variance in a voltage of the common electrode 27. In particular, when the liquid crystal display device 10 is driven in accordance with a gate line inversion process, it would be quite beneficial to form the common electrode 27 with the opening 27a, because a voltage of the common electrode 27 significantly varies.

It should be noted that since the opening 27a is shielded by the black matrix layer 17 as illustrated in FIGS. 3 and 4, the formation of the opening 27a does not reduce an aperture ratio.

In the liquid crystal display device 10 in accordance with the first embodiment, the black matrix layer 17 is formed above the thin film transistor 30 to such a degree that the black matrix layer 17 shields the thin film transistor 30. That is, the black matrix layer 17 has a minimum area necessary for preventing a light from entering the thin film transistor 30. In addition, the black matrix layer 17 is formed only above the thin film transistor 30 as an isolated pattern. By forming the black matrix layer 17 in the above-mentioned manner, it is possible to increase an aperture ratio.

Hereinbelow are explained numerical examples in the liquid crystal display device 10 in accordance with the first embodiment.

It is preferable that the common electrode 27 extends beyond the data line 24 by 3 micrometers or greater in a width-wise direction thereof, when viewed from upward.

The inventors conducted the experiments to find a relation between a cross-talk level and an extension of the common electrode 27 beyond the data line 24. The results are shown in FIG. 10.

A visible level at which a viewer can see a cross-talk is three (3).

Figure 10:
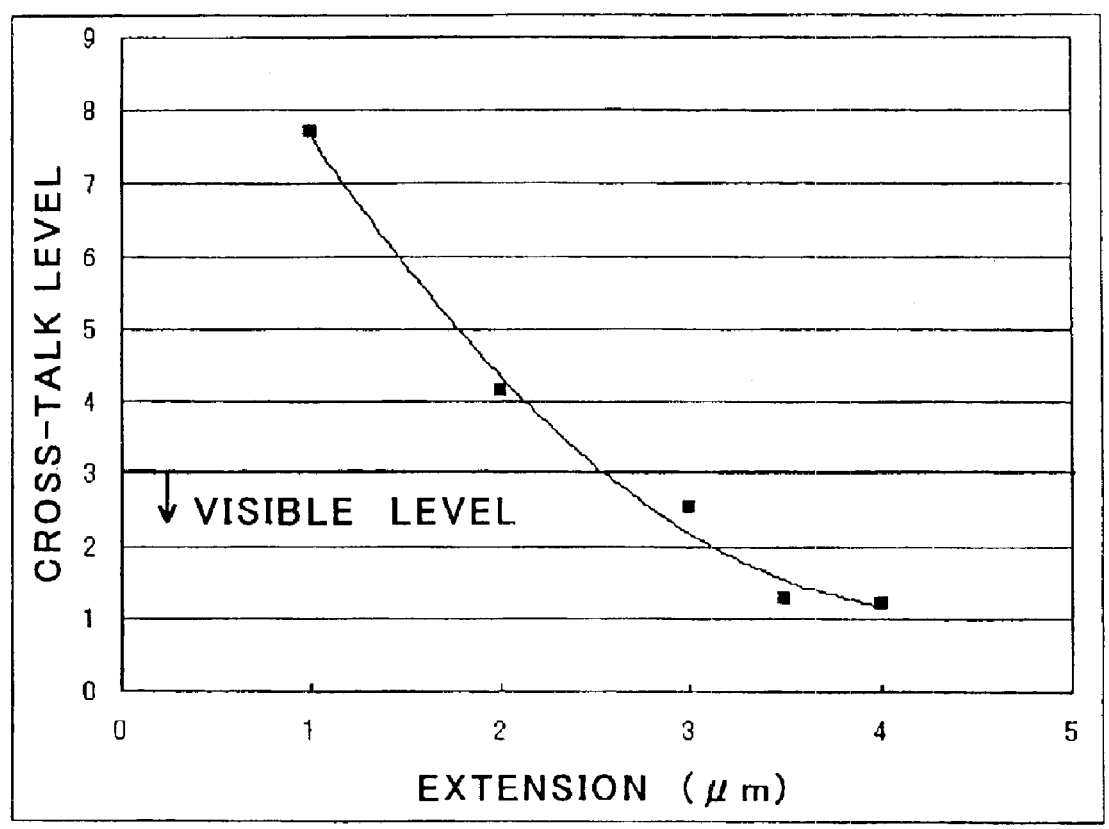
FIG. 10 is a graph showing one of characteristics of the liquid crystal display device in accordance with the first embodiment of the present invention.

As illustrated in FIG. 10, a cross-talk level is equal to three when an extension of the common electrode 27 beyond the data line 24 in a width-wise direction is equal to about 2.5 micrometers, and a cross-talk level becomes smaller than 3 as the extension is greater than 2.5 micrometers.

Accordingly, the extension of the common electrode 27 beyond the data line 24 in a width-wise direction is necessary to be equal to or smaller than 2.5 micrometers, and if the extension is equal to or greater than 3 micrometers, it is surely possible to keep a cross-talk level below a visible level.

It is preferable that the common electrode 27 extends beyond the a scanning line 20 by 1 micrometer or greater in a width-wise direction thereof, when viewed from upward.

The inventors conducted the experiments to find a relation between a cross-talk level and an extension of the common electrode 27 beyond the scanning line 20. The results are shown in FIG. 11.

Figure 11:
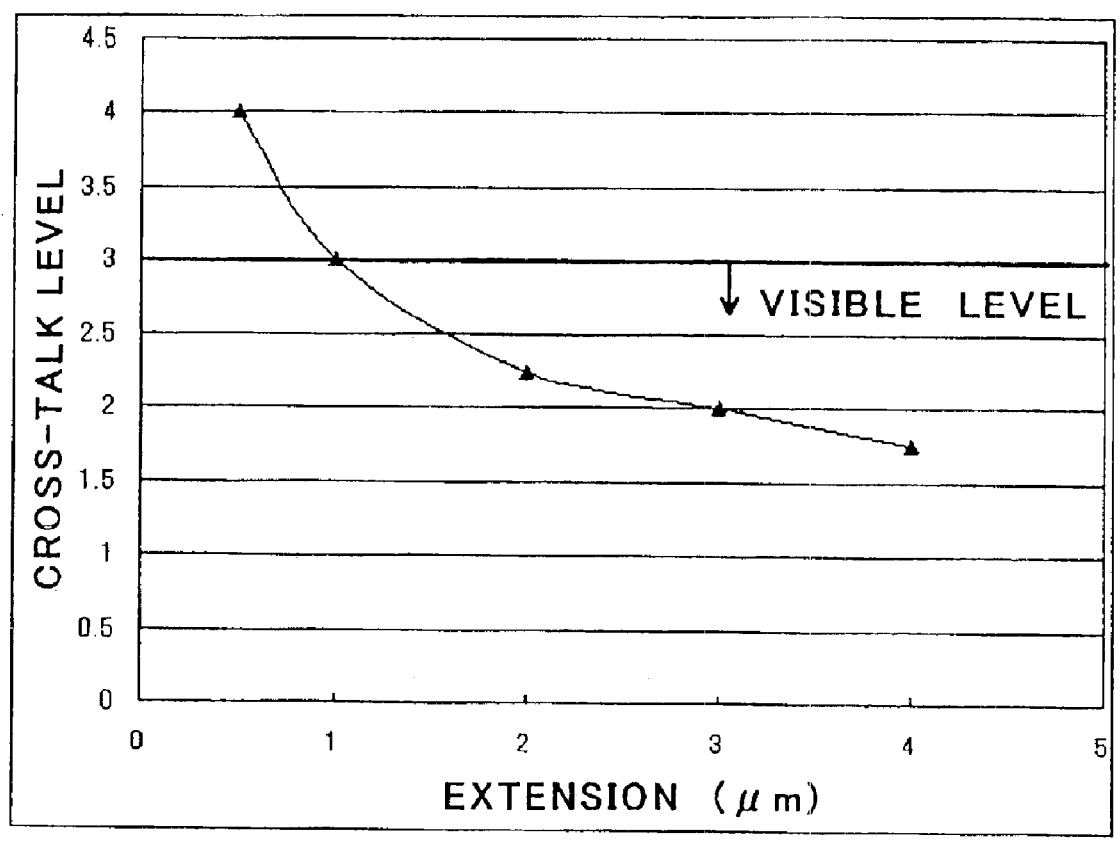
FIG. 11 is a graph showing one of characteristics of the liquid crystal display device in accordance with the first embodiment of the present invention.

As illustrated in FIG. 11, a cross-talk level is equal to three when an extension of the common electrode 27 beyond the data line 24 in a width-wise direction is equal to about 1.0 micrometer, and a cross-talk level becomes smaller than 3 as the extension is greater than 1.0 micrometer.

Accordingly, the extension of the common electrode 27 beyond the scanning line 20 in a width-wise direction is necessary to be equal to or greater than 1.0 micrometer, and if the extension is equal to or greater than 1.5 micrometers, for instance, it is surely possible to keep a cross-talk level below a visible level.

In addition, by designing the extension of the common electrode 27 beyond the scanning line 20 in a width-wise direction to be equal to or greater than 1.0 micrometer, it would be possible to prevent an unnecessary electric field from leaking out of the scanning line 20, and hence, it would be also possible to prevent light leakage out of and around the scanning line 20, when black is displayed in a display screen.

It is preferable that the black matrix layer 17 is composed of a material having a specific resistance of $1 \times 10^{10}$ $\Omega \cdot cm$ or greater.

The inventors conducted the experiments to find a relation between a specific resistance of the black matrix layer 17 and an increase in a luminance. The results are shown in FIG. 12.

A luminance level at which a viewer can recognize an increase in a luminance is one (1). In other words, a visible level is one.

Figure 12:
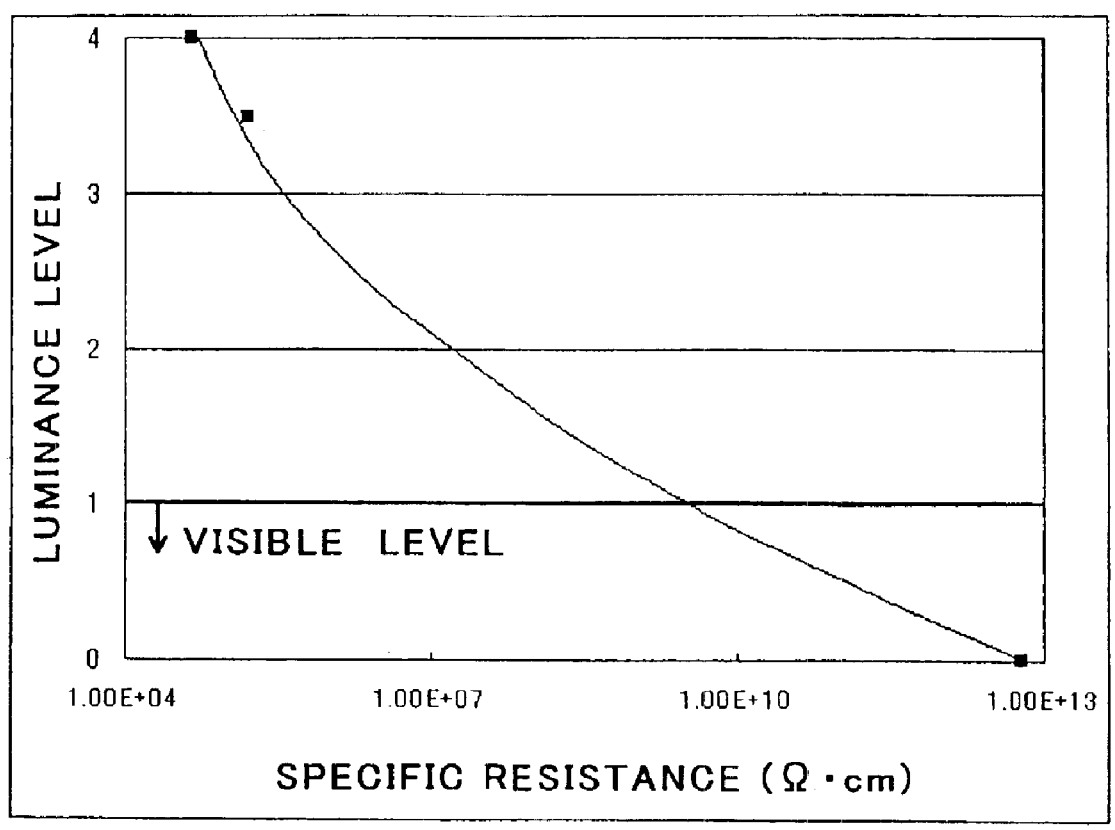
FIG. 12 is a graph showing one of characteristics of the liquid crystal display device in accordance with the first embodiment of the present invention.

As illustrated in FIG. 12, when a material of which the black matrix layer 17 is composed has a specific resistance of $1 \times 10^{9.5}$ $\Omega \cdot cm$, a luminance level becomes equal to a visible level, that is, one, and as a specific resistance becomes greater than $1 \times 10^{9.5}$ $\Omega \cdot cm$, a luminance level becomes smaller than one (1).

Accordingly, a specific resistance of a material of which the black matrix layer 17 is composed is necessary to be equal to or greater than $1 \times 10^{9.5}$ $\Omega \cdot cm$, and if a specific resistance is equal to or greater than $1 \times 10^{10}$ $\Omega \cdot cm$, it is surely possible to keep a luminance level below a visible level.

An example of a material having a specific resistance of $1 \times 10^{9.5}$ $\Omega \cdot cm$ or greater is titanium oxide as black pigment containing resin scattered therein.

Liquid crystal in the liquid crystal layer 13 has dielectric constant anisotropy $\Delta \in$ of preferably 9 or greater, and more preferably, 11 or greater.

Figure 13:
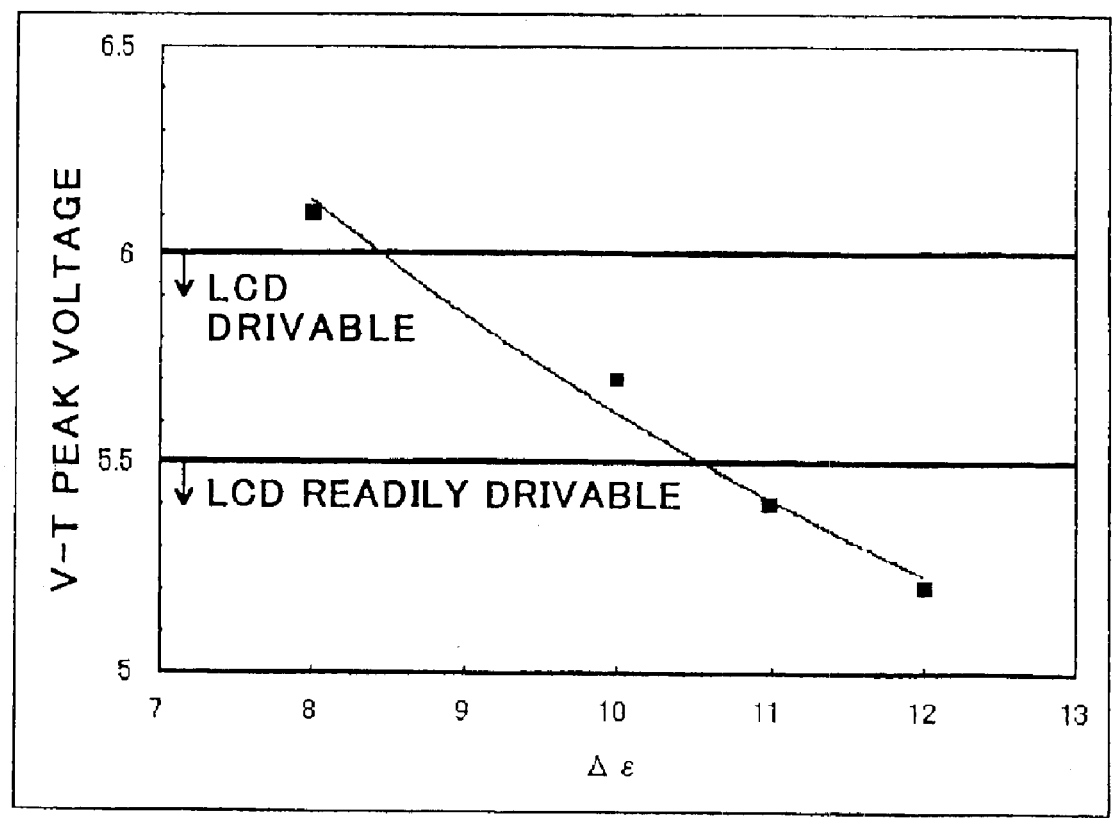
FIG. 13 is a graph showing one of characteristics of the liquid crystal display device in accordance with the first embodiment of the present invention.

The inventors conducted the experiments to find a relation between dielectric constant anisotropy $\Delta \in$ of the liquid crystal and a V-T peak voltage. The results are shown in FIG. 13. Herein, a V-T peak voltage indicates a voltage applied across liquid crystal for presenting a maximum transmissivity.

In general, a V-T peak voltage is set preferably equal to or smaller than 6 V, and more preferably equal to or smaller than 5.5 V in order to drive a liquid crystal display device with an appropriate voltage. For instance, an effective voltage between a pixel electrode and a common electrode is generally 5 V.

As illustrated in FIG. 13, when dielectric constant anisotropy $\Delta\in$ of the liquid crystal is equal to about 8.4, a V-T peak voltage is equal to 6 V, and when dielectric constant anisotropy $\Delta\in$ of the liquid crystal is equal to about 10.6, a V-T peak voltage is equal to 5.5 V.

Accordingly, dielectric constant anisotropy $\Delta\in$ of the liquid crystal is necessary to be equal to or greater than about 8.4, and hence, if dielectric constant anisotropy $\Delta\in$ of the liquid crystal is equal to or greater than 9, it is possible to keep a V-T voltage equal to or smaller than 6 V. Furthermore, if dielectric constant anisotropy $\Delta\in$ of the liquid crystal is equal to or greater than 11, it is possible to keep a V-T voltage smaller than 5.5 V, ensuring that the liquid crystal display device could be driven relatively readily.

Liquid crystal constituting the liquid crystal layer 13 has an N/I point (clearing point) of preferably 80 degrees centigrade or higher, and more preferably 90 degrees centigrade or higher.

By designing an N/I point in the above-mentioned way, the liquid crystal display device 10 in accordance with the first embodiment can be applied to a device having a display unit, such as a cellular phone.

Figure 14:
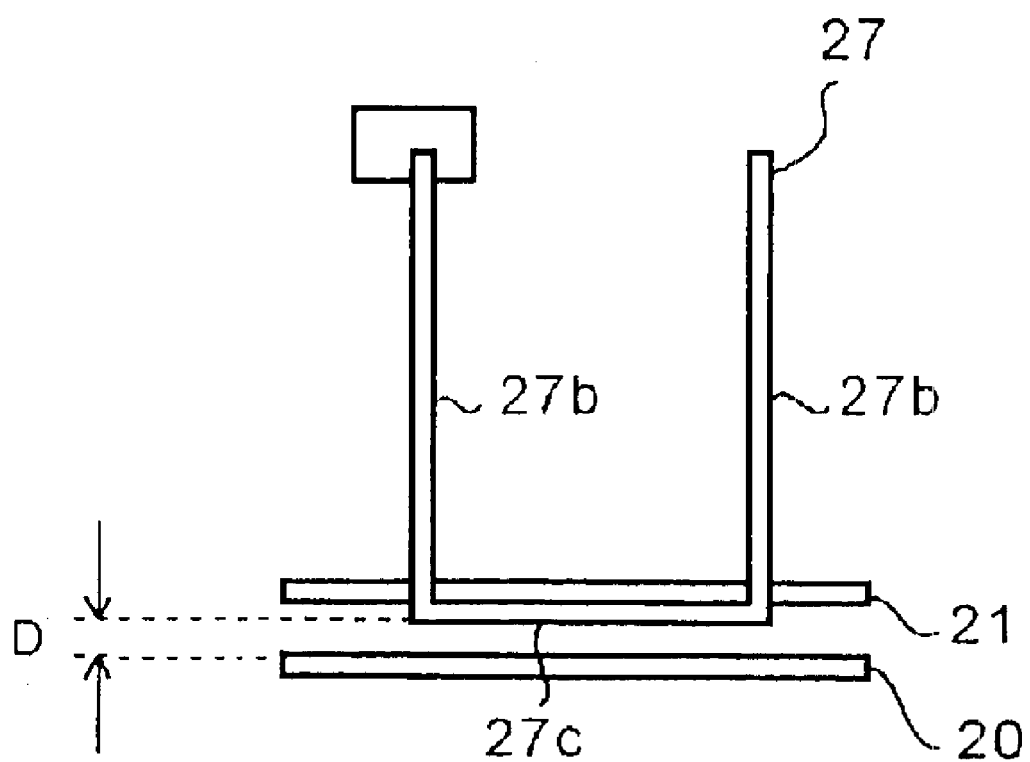
FIG. 14 is a partial plan view of the liquid crystal display device in accordance with the first embodiment of the present invention.

FIG. 14 is a plan view showing a positional relation between the pixel electrode 27, the scanning line 20 and the common electrode line 21, when viewed from upward.

As illustrated in FIG. 14, the pixel electrode 27 is comprised of a plurality of first portions 27b in the form of a line, extending in parallel with one another, and a second portion 27c extending perpendicularly to the first portions 27b and connecting the first portions 27b at their ends to one another.

It is preferable that the second portion 27c overlap the common electrode line 21, in which case, the second portion 27c and the common electrode line 21 can form an accumulation capacity 32 (see FIG. 5) therebetween.

When the pixel electrode 27 is designed to be comprised of the first portions 27b and the second portion 27c as illustrated in FIG. 14, it is preferable that the second portion 27c is spaced away from a scanning line 20 in the next stage by a distance D equal to or greater than 3 micrometers.

Figure 15:
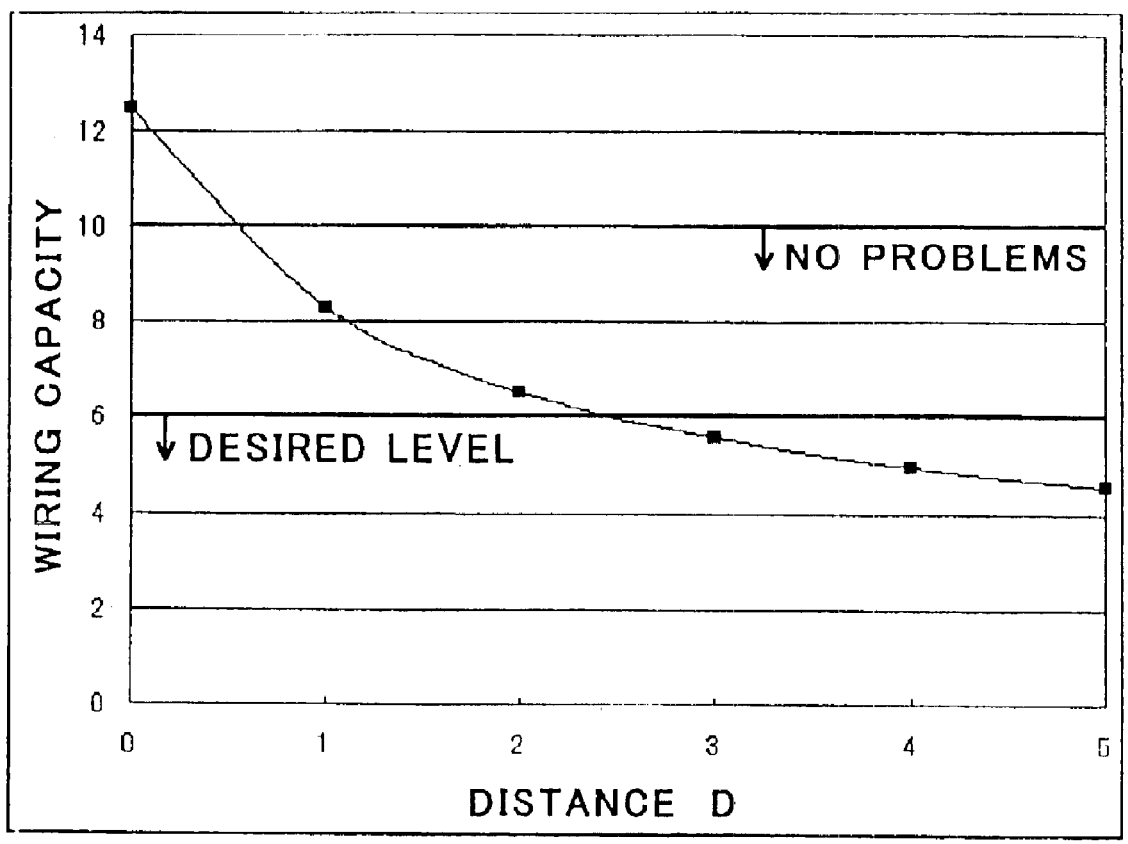
FIG. 15 is a graph showing one of characteristics of the liquid crystal display device in accordance with the first embodiment of the present invention.

The inventors conducted the experiments to find a relation between the distance D and a wiring capacity of the scanning line 20. The results are shown in FIG. 15. An axis of ordinate in FIG. 15 indicates a relative wiring capacity on the assumption that a wiring capacity at which no problems are caused in displaying images is ten (10).

If the scanning line 20 has a wiring capacity equal to or smaller than 10, no problems are caused in displaying images. If the scanning line 20 has a wiring capacity equal to or smaller than 6, it would be possible to enhance display quality.

As illustrated in FIG. 15, when the distance D is equal to about 0.6 micrometers, the wiring capacity is equal to about 10, and as the distance D becomes greater than about 0.6 micrometers, the wiring capacity becomes smaller than 10. When the distance D is equal to about 2.4 micrometers, the wiring capacity is equal to about 6, and as the distance D becomes greater than about 2.4 micrometers, the wiring capacity becomes smaller than 6.

Accordingly, the distance D is necessary to be equal to or greater than 0.6 micrometers, and if the distance D is equal to or greater than 1.0 micrometers, it would be possible to avoid problems in displaying images. It is preferable that the distance D is equal to or greater than 2.4 micrometers, and if the distance D is equal to or greater than 3 micrometers, it would be possible to display images in a desired way.

The pixel electrode 26 cooperates with the second portion 27c of the common electrode 27 and the common electrode line 21 to define the accumulation capacity 32 (see FIG. 6) therebetween.

It is preferable that the color layers 18 are arranged in such a manner that adjacent color layers are arranged without a gap.

If there is a gap between adjacent color layers 18, there is caused a problem that when a monotone color is to be displayed, white is mixed with a certain color, and accordingly, a range of color which can be displayed is narrowed. In addition, if a user obliquely watches a liquid crystal panel, displayed colors may be shifted in an oblique viewing angle, because a light having passed through a certain pixel is observed as if it comes from an adjacent pixel. These problems can be solved by arranging adjacent color layers 18 without a gap therebetween.

In order to arrange the adjacent color layers 18 so as not to have a gap therebetween, they may be, arranged to partially overlap each other. For instance, the adjacent color layers 18 may be arranged to partially overlap each other by 3 micrometers or greater.

FIGS. 16A to 16G are cross-sectional views of the active device substrate 11 of the liquid crystal display device 10 in accordance with the first embodiment, illustrating respective steps of a method of fabricating the same. Each of FIGS. 16A to 16G includes three drawings, that is, a cross-sectional view of an area around a display screen, a cross-sectional view of a pixel, and a plan view of a pixel arranged in this order from the left.

An example of a method of fabricating the in-plane switching mode active matrix type liquid crystal display device 10 in accordance with the first embodiment is explained hereinbelow with reference to FIGS. 16A to 16G.

Figure 16A:
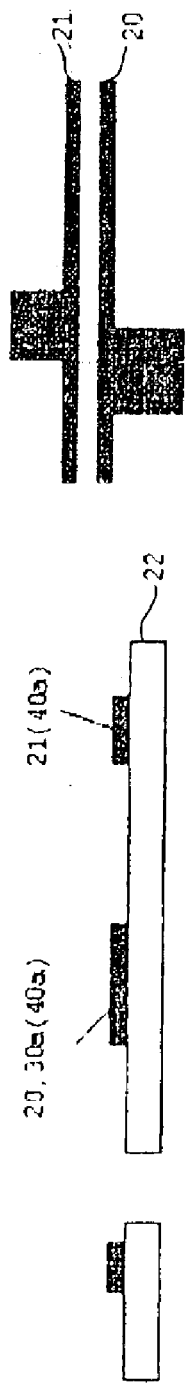

As illustrated in FIG. 16A, the first metal layer 40a is formed on the electrically insulating transparent substrate 22. Then, the first metal layer 40a is patterned into the gate electrode 30a, the scanning line 20 and the common electrode line 21. Thus, the gate electrode 30a, the scanning line 20 and the common electrode line 21 are simultaneously formed.

Figure 16B:
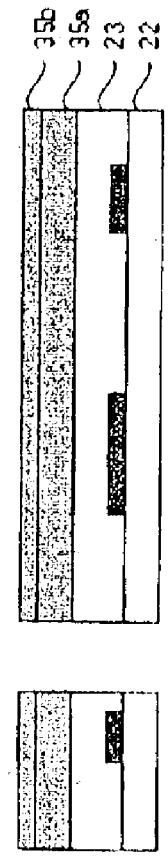

Then, as illustrated in FIG. 16B, the gate insulating film 23 is formed on the electrically insulating transparent substrate 22, covering the gate electrode 30a, the scanning line 20 and the common electrode line 21 therewith.

Then, an i-layer 35a into which no impurity is doped is formed on the gate insulating film 23, and an n-layer 35b into which n-type impurity is doped is formed on the i-layer 35a.

Figure 16C:
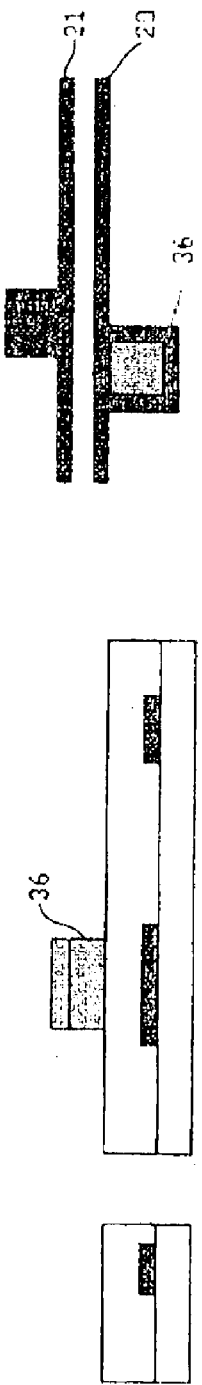

Then, as illustrated in FIG. 16C, the i-layer 35a and n-layer 35b are patterned into an island 36 which will be a part of the thin film transistor 30.

Then, as illustrated in FIG. 16D, the second metal layer 40b composed of chromium is formed on the gate insulating film 23 and the island 36, and then, patterned into the data line 24 and the source electrode 30c.

By patterning the second metal layer 40b, the pixel electrode 25 is simultaneously formed, though not illustrated.

Then, as illustrated in FIG. 16E, the interlayer insulating film 26 is formed on the gate insulating film 23, covering the data line 24, the island 36 and the source electrode 30c therewith.

Then, as illustrated in FIG. 16F, the contact hole 29 reaching the common electrode line 21 is formed throughout the interlayer insulating film 26 and the gate insulating film 23, and simultaneously, the contact hole 37 reaching the data line 24 is formed throughout the interlayer insulating film 26.

Figure 16G:
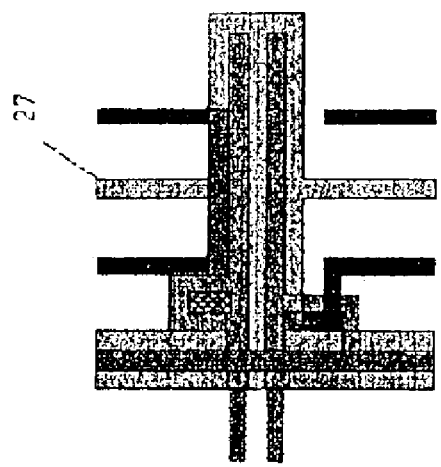
Figure 16G:
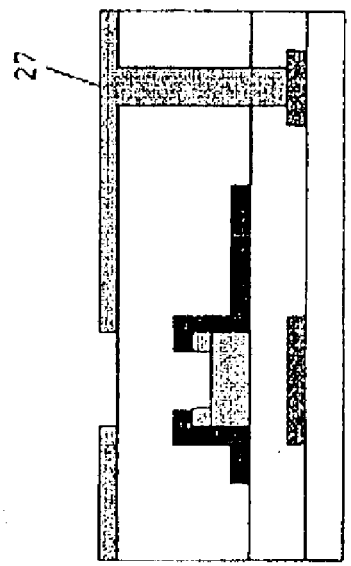
Figure 16G:
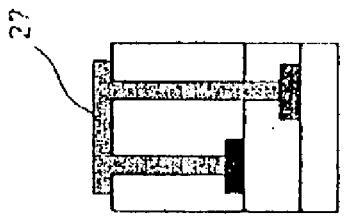

Then, as illustrated in FIG. 16G, an indium tin oxide (ITO) film is formed on the interlayer insulating film 26 such that the contact holes 29 and 37 are filled with indium tin oxide (ITO). Then, the indium tin oxide film is patterned into the common electrode 27.

Thus, there is completed the active device substrate 11 of the in-plane switching mode active matrix type liquid crystal display device 10 in accordance with the first embodiment.

In the liquid crystal display device 10, as illustrated in FIG. 3, the common electrode 27 is designed to have an oblique edge 27b as an auxiliary edge such that if a rubbing direction or a liquid crystal alignment direction L defined by rubbing rotates in a clockwise direction by an acute angle from the liquid crystal alignment direction L, the liquid crystal alignment direction L overlaps a direction of an electric field applied across the pixel electrode 25, and the common electrode 27 and the common electrode line 21 having the same voltage as a voltage of the common electrode 27.

If there exists an area in which the liquid crystal alignment direction would overlap the direction of the electric field by rotating the liquid crystal alignment direction in a counterclockwise direction by a certain acute angle, the area would generate domain at an end of a pixel, in which liquid crystal rotates in a direction opposite to a desired direction, when an electric filed is applied across the pixel electrode 27 and the common electrode 25. If there exists such a domain as mentioned above, and disclination is kept generated for a long time at a boundary between the above-mentioned domain in, which liquid crystal molecules rotate in a desired direction and a domain in which liquid crystal molecules rotate in a direction opposite to a desired direction, display quality would be lowered, and a condition identical with the initial condition might not be obtained, resulting in reduction in reliability of the liquid crystal display device 10.

The above-mentioned reverse rotation of liquid crystal molecules could be prevented by designing the common electrode 27 to have the oblique edge 27b as a reverse-rotation preventing structure. Herein, in the specification, a structure which twists liquid crystal molecules only in a single direction by designing the common electrode 27 to have the oblique edge 27b is called a reverse-rotation preventing structure.

[Second Embodiment]

Figure 17:
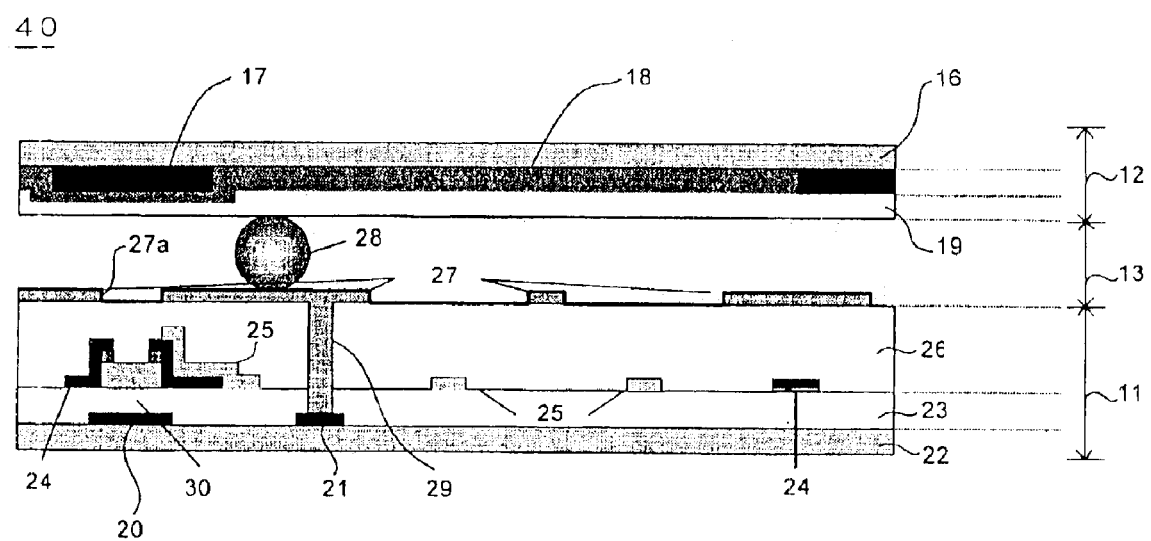
FIG. 17 is a cross-sectional view of an in-plane switching mode active matrix type liquid crystal display device in accordance with the second embodiment of the present invention.

FIG. 17 is a cross-sectional view of an in-plane switching mode active matrix type liquid crystal display device 40 in accordance with the second embodiment of the present invention.

In the liquid crystal display device 10 in accordance with the above-mentioned first embodiment, only the common electrode 27 is composed of indium tin oxide (ITO), an electrically conductive transparent material. In the liquid crystal display device 40 in accordance with the second embodiment, not only the common electrode 27, but also the pixel electrode 25 is composed of ITO. The liquid crystal display device 40 in accordance with the second embodiment has the same structure as the structure of the liquid crystal display device 10 in accordance with the above-mentioned first embodiment except that the pixel electrode 25 is composed of ITO.

By composing not only the common electrode 27, but also the pixel electrode 25 of ITO, an electrically conductive transparent material, the liquid crystal display device 40 has an aperture ratio higher than the same of the liquid crystal display device 10.

FIGS. 18A to 18I are cross-sectional views of the active device substrate 11 of the liquid crystal display device 40 in accordance with the second embodiment, illustrating respective steps of a method of fabricating the same. Each of FIGS. 18A to 18I includes three drawings, that is, a cross-sectional view of an area around a display screen, a cross-sectional view of a pixel, and a plan view of a pixel arranged in this order from the left, similarly to FIGS. 16A to 16G.

An example of a method of fabricating the in-plane switching mode active matrix type liquid crystal display device 40 in accordance with the second embodiment is explained hereinbelow with reference to FIGS. 18A to 18I.

Figure 18A:
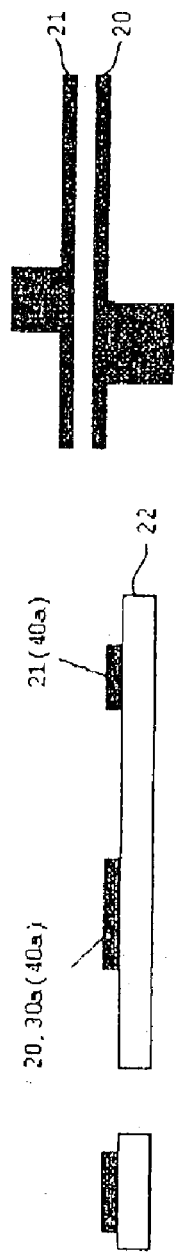

As illustrated in FIG. 18A, the first metal layer 40a is formed on the electrically insulating transparent substrate 22. Then, the first metal layer 40a is patterned into the gate electrode 30a, the scanning line 20 and the common electrode line 21. Thus, the gate electrode 30a, the scanning line 20 and the common electrode line 21 are simultaneously formed.

Figure 18B:
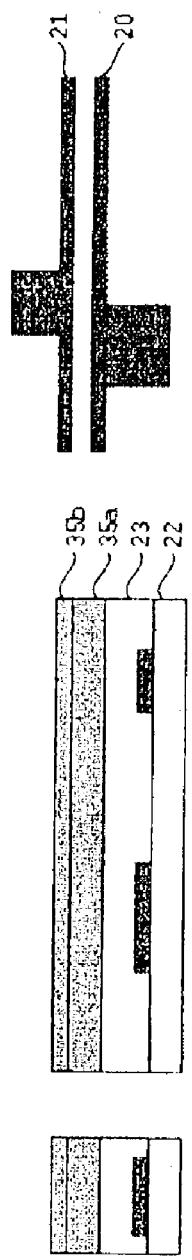

Then, as illustrated in FIG. 18B, the gate insulating film 23 is formed on the electrically insulating transparent substrate 22, covering the gate electrode 30a, the scanning line 20 and the common electrode line 21 therewith.

Then, an i-layer 35a into which no impurity is doped is formed on the gate insulating film 23, and an n-layer 35b into which n-type impurity is doped is formed on the i-layer 35a.

Figure 18C:
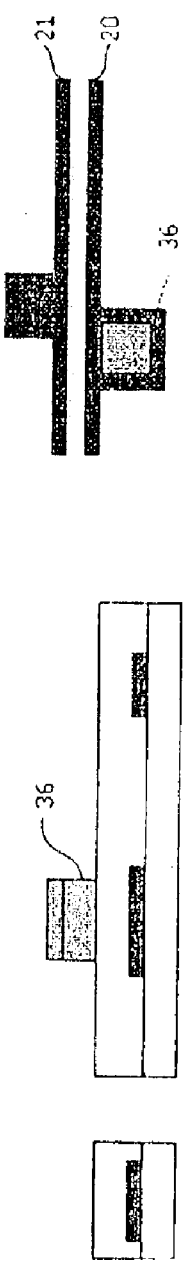

Then, as illustrated in FIG. 18C, the i-layer 35a and n-layer 35b are patterned into an island 36 which will be a part of the thin film transistor 30.

Then, as illustrated in FIG. 18D, the contact hole 37 is formed throughout the gate insulating film 23 around a pixel such that the contact hole 37 reaches the gate electrode 30a.

Then, as illustrated in FIG. 18E, the second metal layer 40b composed of chromium is formed on the gate insulating film 23, and then, patterned by photolithography and etching into the data line 24 and the source electrode 30c.

When the data line 24 is formed by patterning the second metal layer 40b, the data line 24 is electrically connected to a wiring layer of a protection a circuit (not illustrated) which is formed in the same layer as a layer in which the scanning line 20 is formed, through the second metal layer 40b covering an inner surface of the contact hole 37 therewith. Then, the scanning line 20 is electrically connected around a display screen to a wiring layer of a protection circuit (not illustrated) which is formed in the same layer as a layer in which the data line 24 is formed, through a contact hole (not illustrated) formed throughout the gate insulating film 23.

Thus, as illustrated in the center drawing in FIG. 18E, the data line 24 and the scanning line 20 are electrically connected to each other around the scanning line 20. The reason why the data line 24 and the scanning line 20 are electrically connected to each other at this stage is that, if the data line 24 is formed by etching before the data line 24 and the scanning line 20 are electrically connected to each other, the data line 24 may be fused during etching.

Then, as illustrated in FIG. 18F, an indium tin oxide (ITO) film is formed on the gate insulating film 23, and then, patterned into the pixel electrode 25.

Figure 18G:
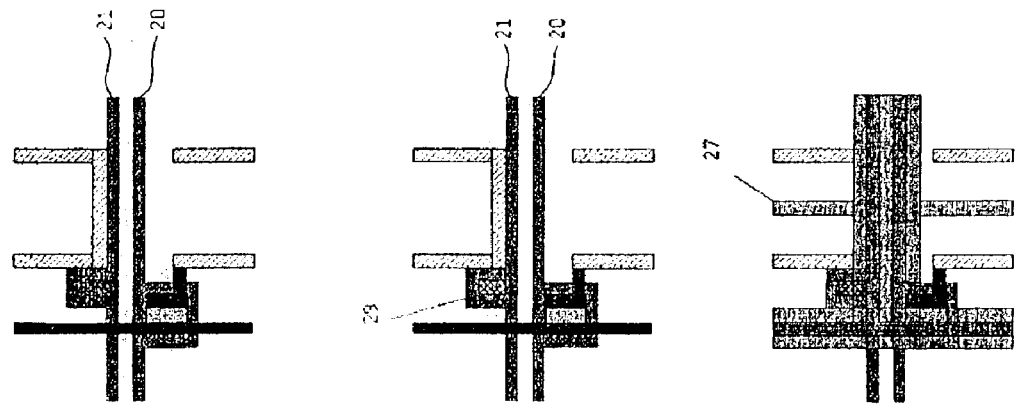
Figure 18G:
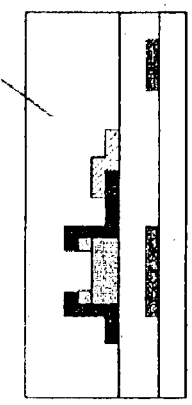
Figure 18G:
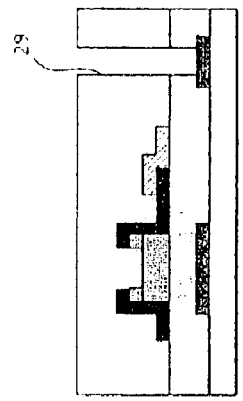
Figure 18G:
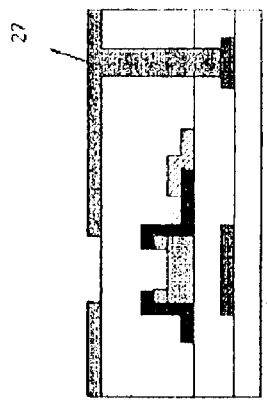
Figure 18G:

Then, as illustrated in FIG. 18G, the interlayer insulating film 26 is formed on the gate insulating film 23, covering the data line 24, the island 36, the source electrode 30c and the pixel electrode 25 therewith.

Figure 18H:

Then, as illustrated in FIG. 18H, the contact hole 29 reaching the common electrode line 21 is formed throughout the interlayer insulating film 26 and the gate insulating film 23.

Figure 18I:

Then, as illustrated in FIG. 18I, an indium tin oxide (ITO) film is formed on the interlayer insulating film 26 such that the contact hole 29 is filled with indium tin oxide (ITO). Then, the indium tin oxide film is patterned into the common electrode 27.

Thus, there is completed the active device substrate 11 of the in-plane switching mode active matrix type liquid crystal display device 40 in accordance with the second embodiment.

[Third Embodiment]

Figure 19:
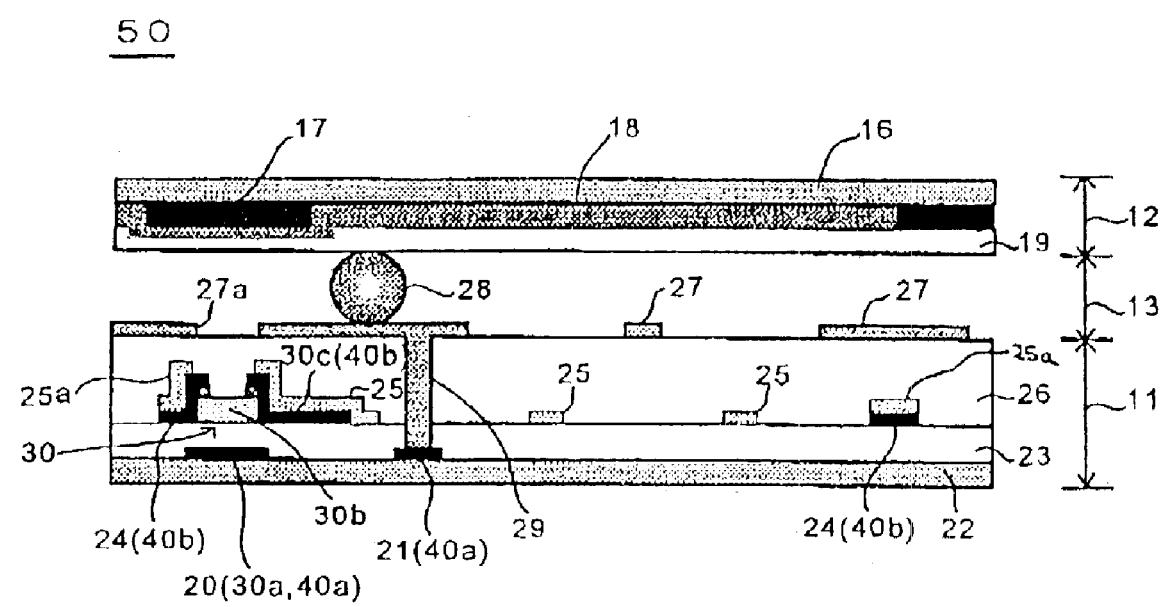
FIG. 19 is a cross-sectional view of an in-plane switching mode active matrix type liquid crystal display device in accordance with the third embodiment of the present invention.

FIG. 19 is a cross-sectional view of an in-plane switching mode active matrix type liquid crystal display device 50 in accordance with the third embodiment of the present invention.

In the liquid crystal display device 50 in accordance with the third embodiment, the pixel electrode 25 is composed of ITO similarly to the second embodiment, and a transparent 25a covers the data line 24 therewith as a protection layer. The liquid crystal display device 50 in accordance with the third embodiment has the same structure as the structure of the liquid crystal display device 40 in accordance with the above-mentioned second embodiment except that the transparent 25a covers the data line 24 therewith.

The transparent electrode 25a is composed of ITO similarly to the pixel electrode 25, and is formed concurrently with the pixel electrode 25. Since the transparent electrode 25a can be formed by partially changing a pattern in accordance with which the pixel electrode 25 is formed, the number of steps for fabricating the liquid crystal display device 50 is not increased in comparison with the number of steps for fabricating the liquid crystal display device 40 in accordance with the second embodiment.

By covering the data line 24 with the transparent electrode 25a, it would be possible to prevent the data line 24 from being fused by etching to be carried out when the pixel electrode 25 is formed.

[Fourth Embodiment]

Figure 20:
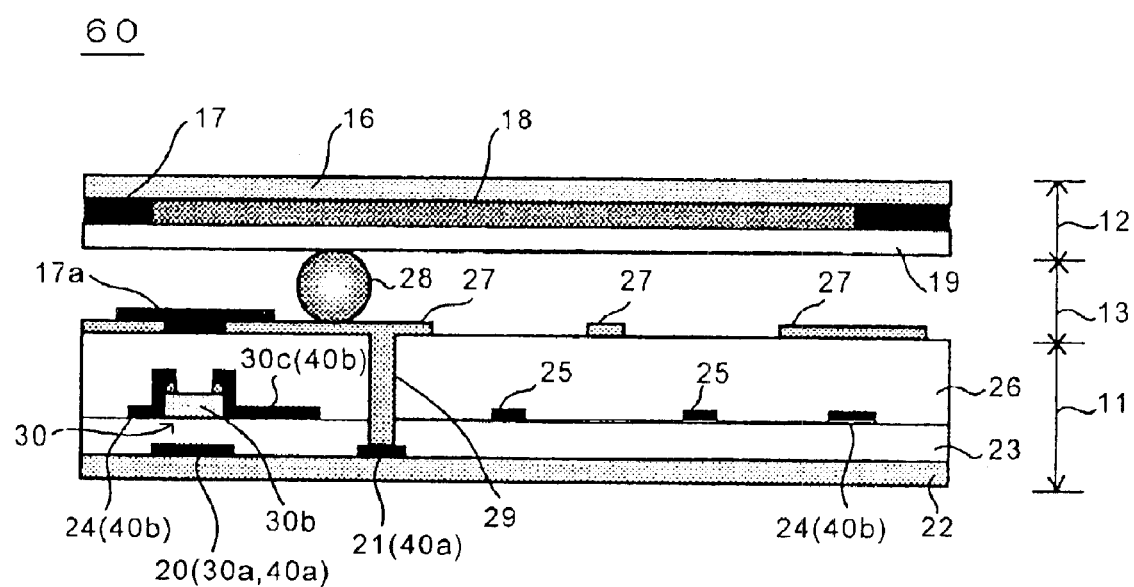
FIG. 20 is a cross-sectional view of an in-plane switching mode active matrix type liquid crystal display device in accordance with the fourth embodiment of the present invention.

FIG. 20 is a cross-sectional view of an in-plane switching mode active matrix type liquid crystal display device 60 in accordance with the fourth embodiment of the present invention.

In the liquid crystal display device 10 in accordance with the above-mentioned first embodiment, the black matrix layer 17 is formed as a part of the opposing substrate 12, as illustrated in FIG. 4. In contrast, a black matrix layer 17a in the liquid crystal display device 60 in accordance with the fourth embodiment is formed as a part of the active device substrate 11.

The black matrix layer 17a shields the opening 27a of the common electrode 27, and is formed only above the thin film transistor 30 to such a degree that the black matrix layer 17a overlaps the thin film transistor 30, similarly to first embodiment. That is, the black matrix layer 17a has a minimum size necessary for preventing a light from entering the thin film transistor 30. In addition, the black matrix layer 17a is not formed above the scanning line 20 and the data line 24, and is formed only above the thin film transistor 30 in an isolated pattern.

The liquid crystal display device 60 in accordance with the fourth embodiment has the same structure as the structure of the liquid crystal display device 10 in accordance with the above-mentioned first embodiment except that the black matrix layer 17a is a part of the active device substrate 11.

Even if the black matrix layer 17a is formed as a part of the active device substrate 11, the liquid crystal display device 60 in accordance with the fourth embodiment provides the same advantages as those obtained by the liquid crystal display device 10 in accordance with the first embodiment.

[Fifth Embodiment]

Figure 21:
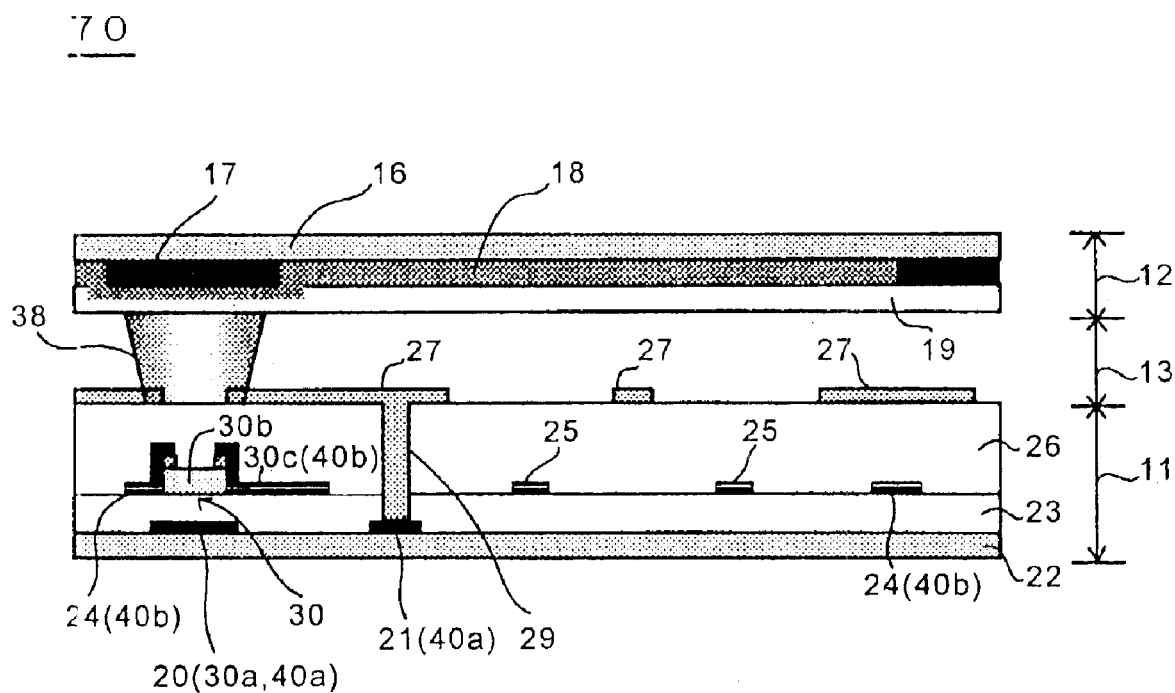
FIG. 21 is a cross-sectional view of an in-plane switching mode active matrix type liquid crystal display device in accordance with the fifth embodiment of the present invention.

FIG. 21 is a cross-sectional view of an in-plane switching mode active matrix type liquid crystal display device 70 in accordance with the fifth embodiment of the present invention.

In the liquid crystal display device 10 in accordance with the first embodiment, as illustrated in FIG. 4, the spacers 28 are sandwiched between the active device substrate 11 and the opposing substrate 12 to ensure a gap therebetween.

The liquid crystal display device 70 in accordance with the fifth embodiment includes pillar-shaped patterns 38 in place of the spacers 28 to ensure a gap between the active device substrate 11 and the opposing substrate 12. The liquid crystal display device 70 in accordance with the fifth embodiment has the same structure as the structure of the liquid crystal display device 10 in accordance with the above-mentioned first embodiment except that the spacers 28 are replaced with the pillar-shaped patterns 38.

The pillar-shaped patterns 38 may be composed of photosensitive resin, for instance, in which case, the pillar-shaped patterns 38 can be formed by carrying out the steps of coating photosensitive resin all over the active device substrate 11, exposing an area in which the pillar-shaped patterns 38 are to be formed (or an area in which the pillar-shaped patterns 38 are not to be formed, in dependence on characteristic of the photosensitive resin), to a light, and carrying out etching to remove the photosensitive resin existing in an area in which the pillar-shaped patterns 38 are not to be formed.

Since it is easier to form the pillar-shaped patterns 38 having a uniform height than to form the spacers 28 having a uniform diameter, it would be possible to shorten a time necessary for fabricating the liquid crystal display device, by replacing the spacers 28 with the pillar-shaped patterns 38.

The pillar-shaped patterns 38 axe formed above the thin film transistors 30, that is, below the black matrix layer 17. Accordingly, an aperture ratio of the liquid crystal display device 70 is not reduced regardless of whether the pillar-shaped pattern 38 is composed of a light-permeable or light-impermeable material.

In the fifth embodiment, the pillar-shaped pattern 38 is formed on the active device substrate 11. However, it should be noted that the pillar-shaped patterns 38 may be formed on the opposing substrate 12, or on both of the active device substrate 11 and the opposing substrate 12.

By replacing the spacers 28 with the pillar-shaped patterns 38, the interlayer insulating film 26 may be composed of photosensitive resin. The pillar-shaped patterns 38 may be formed by patterning the interlayer insulating film 26 in a predetermined pattern.

[Sixth Embodiment]

Figure 22:
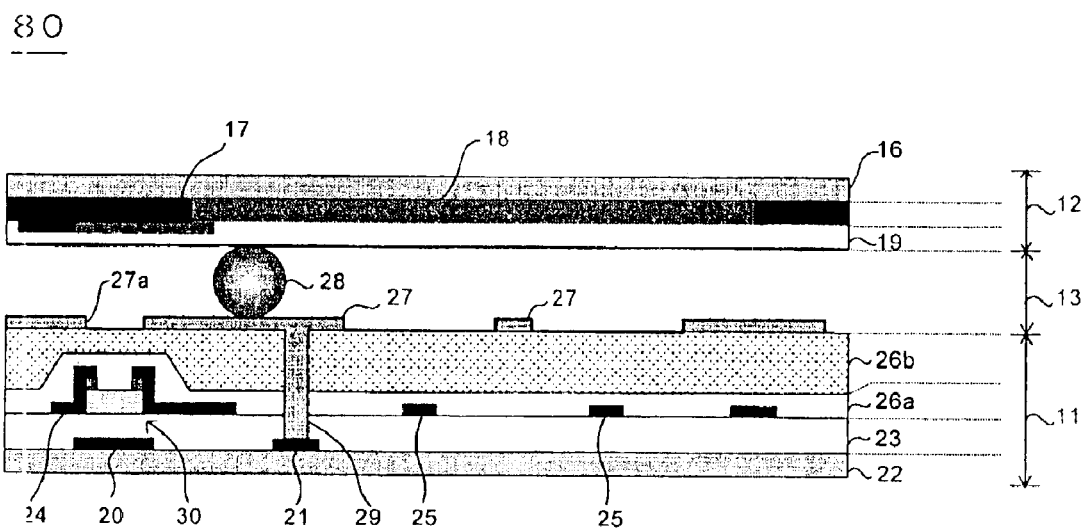
FIG. 22 is a cross-sectional view of an in-plane switching mode active matrix type liquid crystal display device in accordance with the sixth embodiment of the present invention.

FIG. 22 is a cross-sectional view of an in-plane switching mode active matrix type liquid crystal display device 80 in accordance with the sixth embodiment of the present invention.

In the above-mentioned first to fifth embodiments, the interlayer insulating film 26 is comprised of a single-layered film comprised of an organic film or a transparent inorganic film.

In contrast, in the liquid crystal display device 80 in accordance with the sixth embodiment, the interlayer insulating film 26 is designed to have a multi-layered structure.

Specifically, as illustrated in FIG. 22, the interlayer insulating film 26 is comprised of a first film 26a comprised of an inorganic film, and a second film 26b comprised of an organic film and formed on the first film 26a.

The second film 26b is composed of photosensitive acrylic resin, for instance.

An organic film has a lower dielectric constant than the same of an inorganic film. Hence, the interlayer insulating film 26 designed to have such a multi-layered structure as mentioned above can have a lower dielectric constant than the same of an interlayer insulating film comprised of an inorganic film.

If the interlayer insulating film 26 is comprised singly of an organic film, an interface between a semiconductor layer of the thin film transistor 30 and the organic film would become unstable, resulting in that if the liquid crystal display device is driven under a high temperature, a current much leaks out of the thin film transistor 30 with the result of non-uniformity in displaying images. This problem can be solved by designing the first film 26a which makes contact with a semiconductor layer of the thin film transistor 30, to be comprised of an inorganic film such as a silicon nitride film, and arranging an organic film on the first film 26a, because an stable interface is formed between the first film 26a and the semiconductor layer by doing so.

[Seventh Embodiment]

Figure 23:
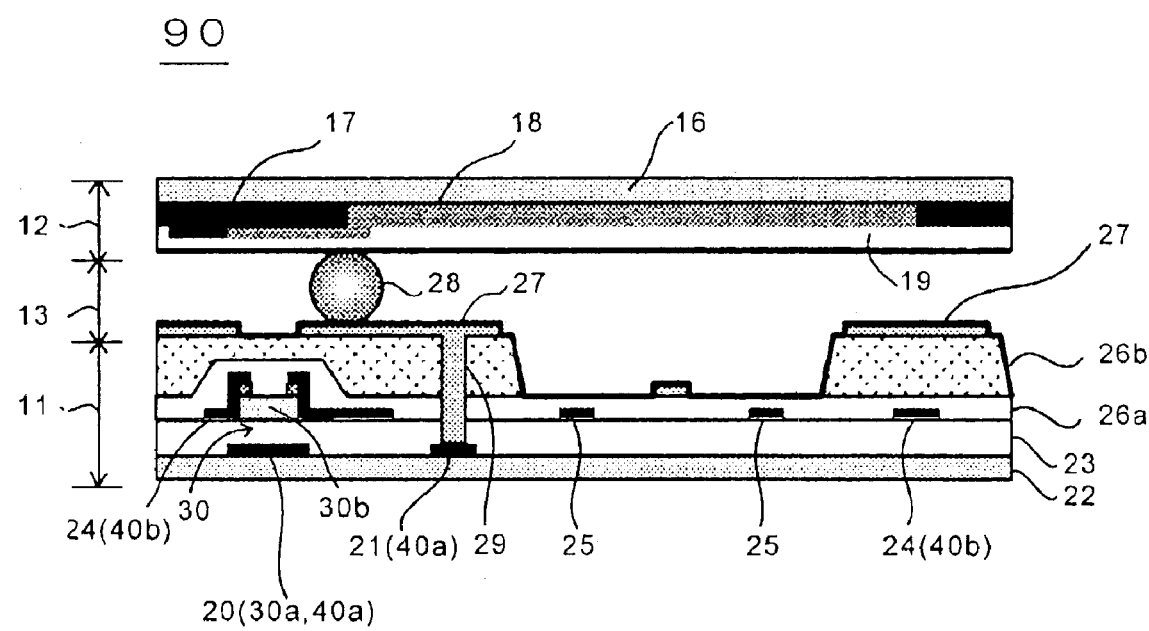
FIG. 23 is a cross-sectional view of an in-plane switching mode active matrix type liquid crystal display device in accordance with the seventh embodiment of the present invention.

FIG. 23 is a cross-sectional view of an in-plane switching mode active matrix type liquid crystal display device 90 in accordance with the seventh embodiment of the present invention.

In the above-mentioned first embodiment, the interlayer insulating film 26 is formed all over a pixel area. In the liquid-crystal display device 90 in accordance with the seventh embodiment, the interlayer insulating film 26 is designed to have a multi-layered structure including an inorganic film 26a and an organic film 26b, wherein the organic film 26b is formed above and in the vicinity of the scanning line 20, the data line 24, the common electrode line 21 and the thin film transistor 30 such that the organic film 26b covers the scanning line 20, the data line 24, the common electrode line 21 and the thin film transistor 30 therewith, but does not cover a display area of the pixel electrode 25 therewith.

The common electrode 27 overlapping the scanning line 21, the data line 24 and the common electrode line 21 is formed on the organic film 26b.

If the organic film 26b is composed of photosensitive acrylic resin, for instance, the organic film 26b would have a dielectric constant in the range of 3 to 4. An inorganic film such as a silicon nitride film has a dielectric constant in the range of 6 to 7. Accordingly, the organic film 26b could ensure a capacity formed between the data line 24 and the common electrode 27 which capacity is equal to a capacity ensured by an inorganic film having a thickness twice greater than a thickness of the organic film 26b.

In the case that the interlayer insulating film 26 is comprised of a thick inorganic film, if the interlayer insulating film 26 is qualified, an expensive film-forming apparatus has to be used, resulting in high fabrication cost. In contrast, since the interlayer insulating film 26 comprised of an organic film can be formed by coating organic material onto the gate insulating film 23, the interlayer insulating film 26 can be formed at low fabrication cost.

In addition, since the interlayer insulating film 26 is comprised only of the inorganic film 26a between the pixel electrode 25 and the common electrode 27, the interlayer insulating film 26 can be made thin. As a result, an electric field generated between the pixel electrode 25 and the common electrode 27 can be applied to the liquid crystal, ensuring reduction in a drive voltage.

The organic film 26b has a thickness preferably in the range of 5,000 to 10,000 angstroms both inclusive.

For instance, the inorganic film 26a may be designed to have, a thickness of 3,000 angstroms, and the organic film 26b may be designed to have a thickness of 6,000 angstroms.

If the inorganic film 26a is too thin, dielectric breakdown may occur between the pixel electrode 25 and the common electrode 27. Hence, it is preferable that the inorganic film 26a has a thickness of 2,000 angstroms or greater.

If the organic film 26b is too thick, foreign materials are stuck to a stepped portion of the organic film 26b in a rubbing step, resulting in degradation in display quality. If the organic film 26b is too thin, a parasitic capacity between the common electrode 27 and the data line 24 is increased, resulting in reduction in display quality.

In the seventh embodiment, since a display area between the pixel electrode 25 and the common electrode 27 is not covered with the organic film 26b having a low dielectric constant, it would be possible to effectively generate a horizontal electric field to be applied to the liquid crystal, by virtue of a voltage difference between the pixel electrode 25 and the common electrode 27, and further, it would be possible to prevent an increase in a parasitic capacity to be formed between the common electrode 27 and the data line 24.

[Eighth Embodiment]

Figure 24:
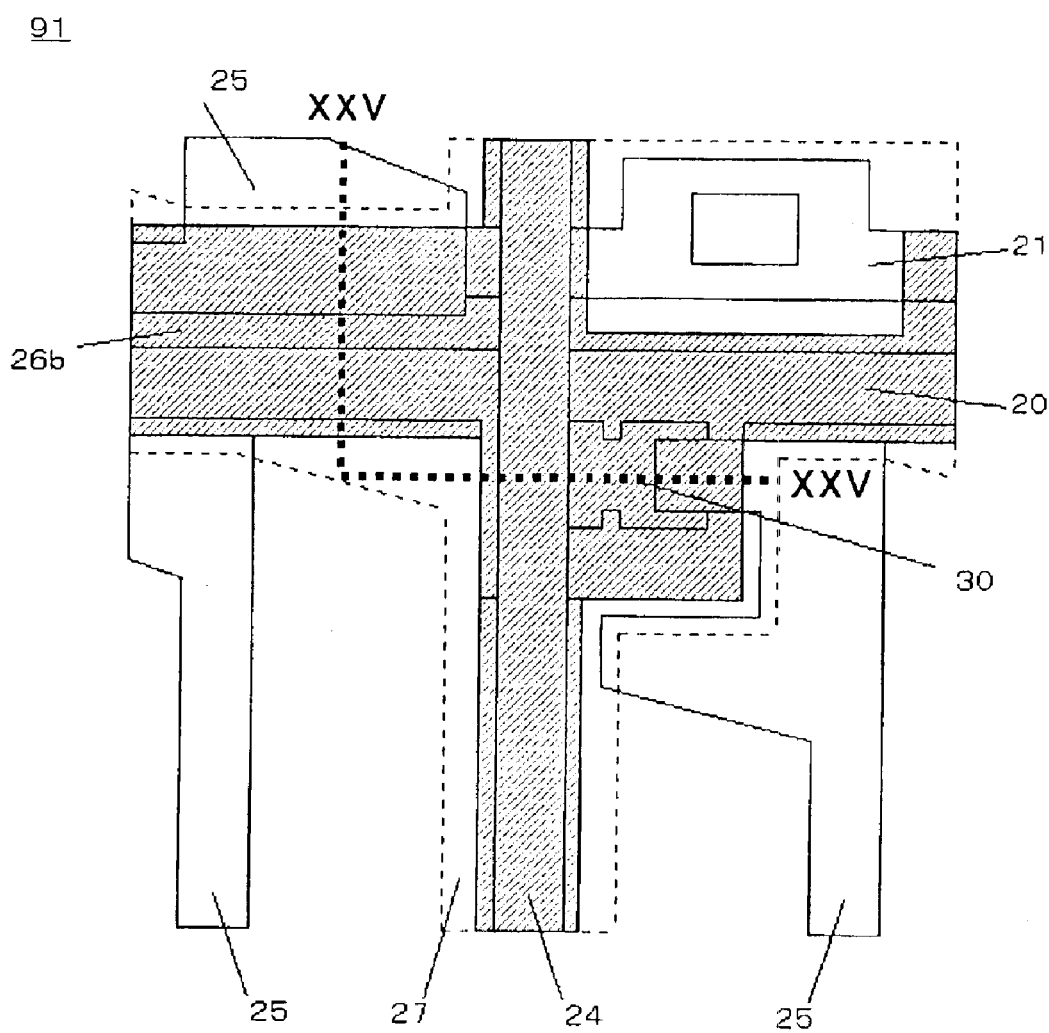
FIG. 24 is a plan view of an in-plane switching mode active matrix type liquid crystal display device in accordance with the eighth embodiment of the present invention.
Figure 25:
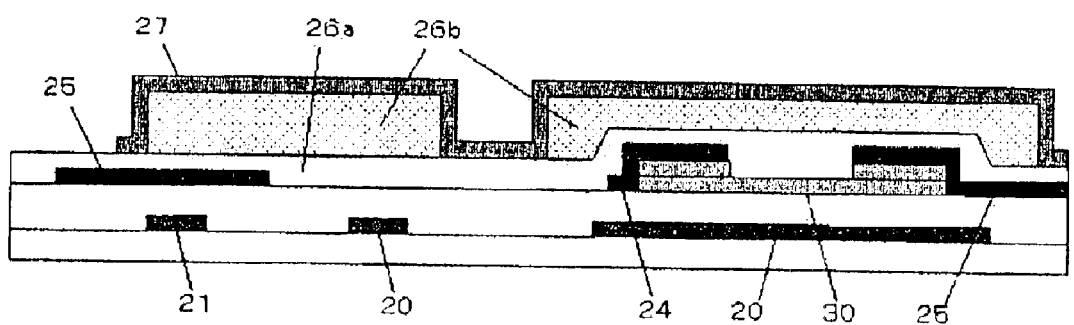
FIG. 25 is a cross-sectional view taken along the line XXV—XXV in FIG. 24.

FIG. 24 is a plan view of an in-plane switching mode active matrix type liquid crystal display device 91 in accordance with the eighth embodiment of the present invention. The liquid crystal display device 91 in accordance with the eighth embodiment is a variant of the liquid crystal display device 90 in accordance with the seventh embodiment. FIG. 25 is a cross-sectional view taken along the line XXV—XXV in FIG. 24, and FIG. 26 is a cross-sectional view of the liquid crystal display device 91.

Figure 26:
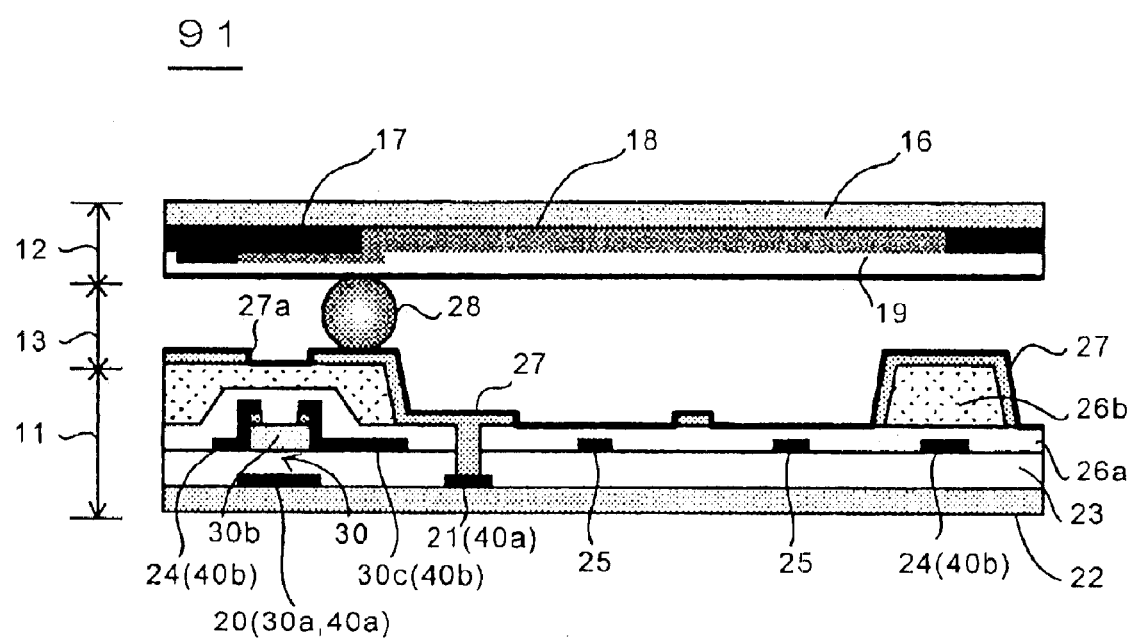
FIG. 26 is a cross-sectional view of the liquid crystal display device illustrated in FIG. 24.

In the liquid crystal display device 91, the interlayer insulating film 26 is comprised of an inorganic film 26a, and an organic film 26b formed partially on the inorganic film 26a, as illustrated in FIGS. 25 and 26. The organic film 26b is formed above and in the vicinity of the scanning line 20, the data line 24, the common electrode line 21 and the thin film transistor 30 such that the organic film 26b covers the scanning line 20, the data line 24, the common electrode line 21 and the thin film transistor 30 therewith, but does not cover a display area of the pixel electrode 25 therewith.

The common electrode 27 is formed covering the organic film 26b therewith. Thus, the organic film 26b is formed inside of the common electrode 27 overlapping the scanning line 20, the data line 24 and the common electrode line 21.

In the eighth embodiment, since a display area between the pixel electrode 25 and the common electrode 27 is not covered with the organic film 26b having a low dielectric constant, it would be possible to effectively generate a horizontal electric field to be applied to the liquid crystal, by virtue of a voltage difference between the pixel electrode 25 and the common electrode 27, and further, it would be possible to prevent an increase in a parasitic capacity to be formed between the common electrode 27 and the data line 24.

[Ninth Embodiment]

Figure 27:
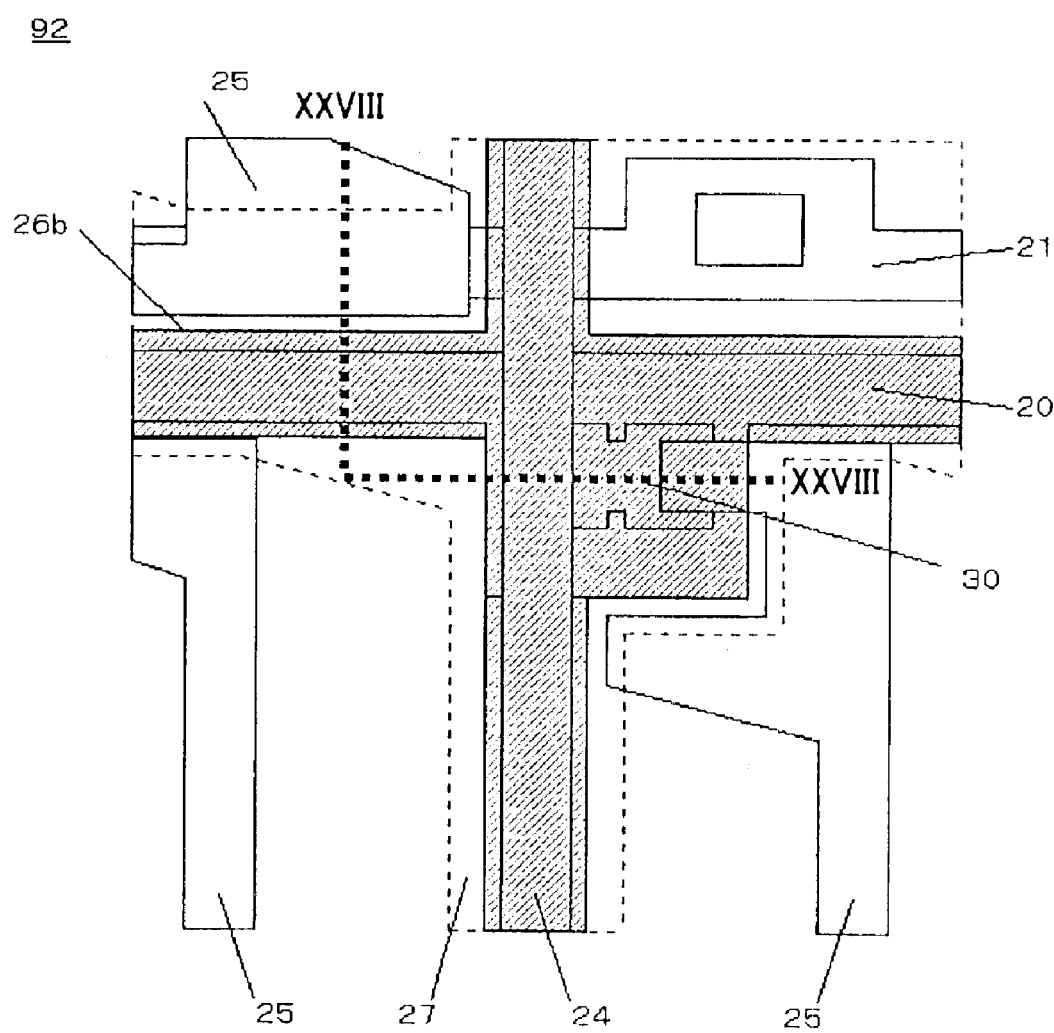
FIG. 27 is a plan view of an in-plane switching mode active matrix type liquid crystal display device in accordance with the ninth embodiment of the present invention.
Figure 28:
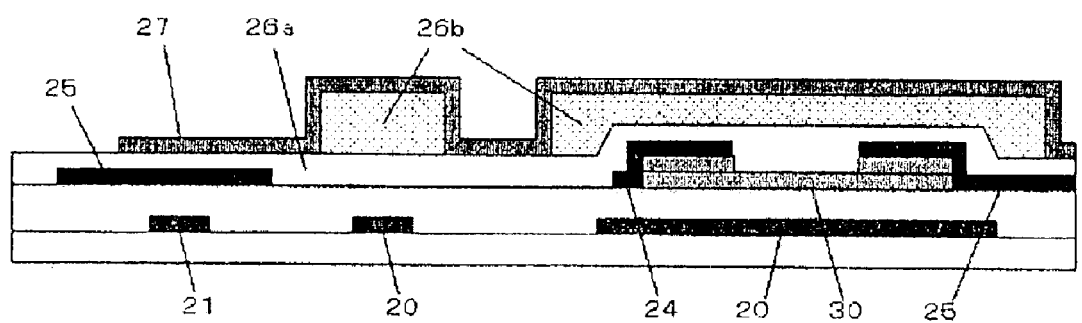
FIG. 28 is a cross-sectional view taken along the line XXVIII—XXVIII in FIG. 27.

FIG. 27 is a plan view of an in-plane switching mode active matrix type liquid crystal display device 92 in accordance with the ninth embodiment of the present invention. The liquid crystal display device 92 in accordance with the ninth embodiment is a variant of the liquid crystal display device 91 in accordance with the eighth embodiment. FIG. 28 is a cross-sectional view taken along the line XXVIII—XXVIII in FIG. 27.

In the liquid crystal display device 92, the interlayer insulating film 26 is comprised of an inorganic film 26a, and an organic film 26b formed partially on the inorganic film 26a, as illustrated in FIG. 28. The organic film 26b is formed above and in the vicinity of the scanning line 20, the data line 24 and the thin film transistor 30 such that the organic film 26b covers the scanning line 20, the data line 24 and the thin film transistor 30 therewith, but does not cover a display area of the pixel electrode 25 therewith.

In accordance with the ninth embodiment, it is possible to shorten a distance between the pixel electrode 25 and the common electrode 27, ensuring an increase in a capacity of the accumulation capacitor 32 (see FIG. 5) formed between the pixel electrode 25 and the common electrode 27. As a result, display quality can be enhanced.

A method of fabricating the active device substrate 11 of the liquid crystal display device 92 in accordance with the ninth embodiment is explained hereinbelow.

The method further includes the step of forming the organic film 26b in comparison with the method of fabricating the active device substrate 11 of the liquid crystal display device 10 in accordance with the first embodiment, having been explained with reference to FIGS. 16A to 16F.

After the second metal layer 40b has been patterned as illustrated in FIG. 16D, the n-layer 35b is etched for removal, and then, the inorganic film 26a is formed on the gate insulating film 23.

Then, photosensitive acrylic resin is coated onto the inorganic film 26a. Then, the inorganic film 26a is exposed to a light, and developed to thereby form the organic film 26b. The organic film 26b is formed above and in the vicinity of the scanning line 20, the data line 24 and the thin film transistor 30.

Then, the contact hole 29 is formed throughout the inorganic film 26a and the gate insulating film 23.

Then, an indium tin oxide (ITO) film is formed on the organic film 26b and the inorganic film 26a such that the contact hole 29 is filled with indium tin oxide. Then, the indium tin oxide film is patterned into the common electrode 27.

The common electrode 27 makes electrical contact with the common electrode line 21 through the contact hole 29 filled with indium tin oxide.

Thus, there is completed the active device substrate 11 of the liquid crystal display device 92.

In the above-mentioned method, it is preferable to remove foreign materials absorbed onto a surface of the common electrode line 21, by generating oxygen plasma, after the contact hole 29 has been formed. This ensures that a contact resistance in the contact hole 29 is reduced, and hence, display quality can be enhanced.

In the above-mentioned method, it is preferable to reform a surface of the organic film 26b by generating helium or argon plasma after the organic film 26b has been formed, but before the contact hole 29 is formed. This enhances adhesion between the organic film 26b and the common electrode 27, and an accuracy at which the common electrode 27 is patterned, resulting in reduction in patterning defectiveness.

A surface of the organic film 26b may be reformed by generating helium or argon plasma after the contact hole 29 has been formed, however, it is not preferable, because foreign materials are stuck again onto a surface of the common electrode line 21 with the result in an increase in a contact resistance of the contact hole 29.

[Tenth Embodiment]

Figure 29:
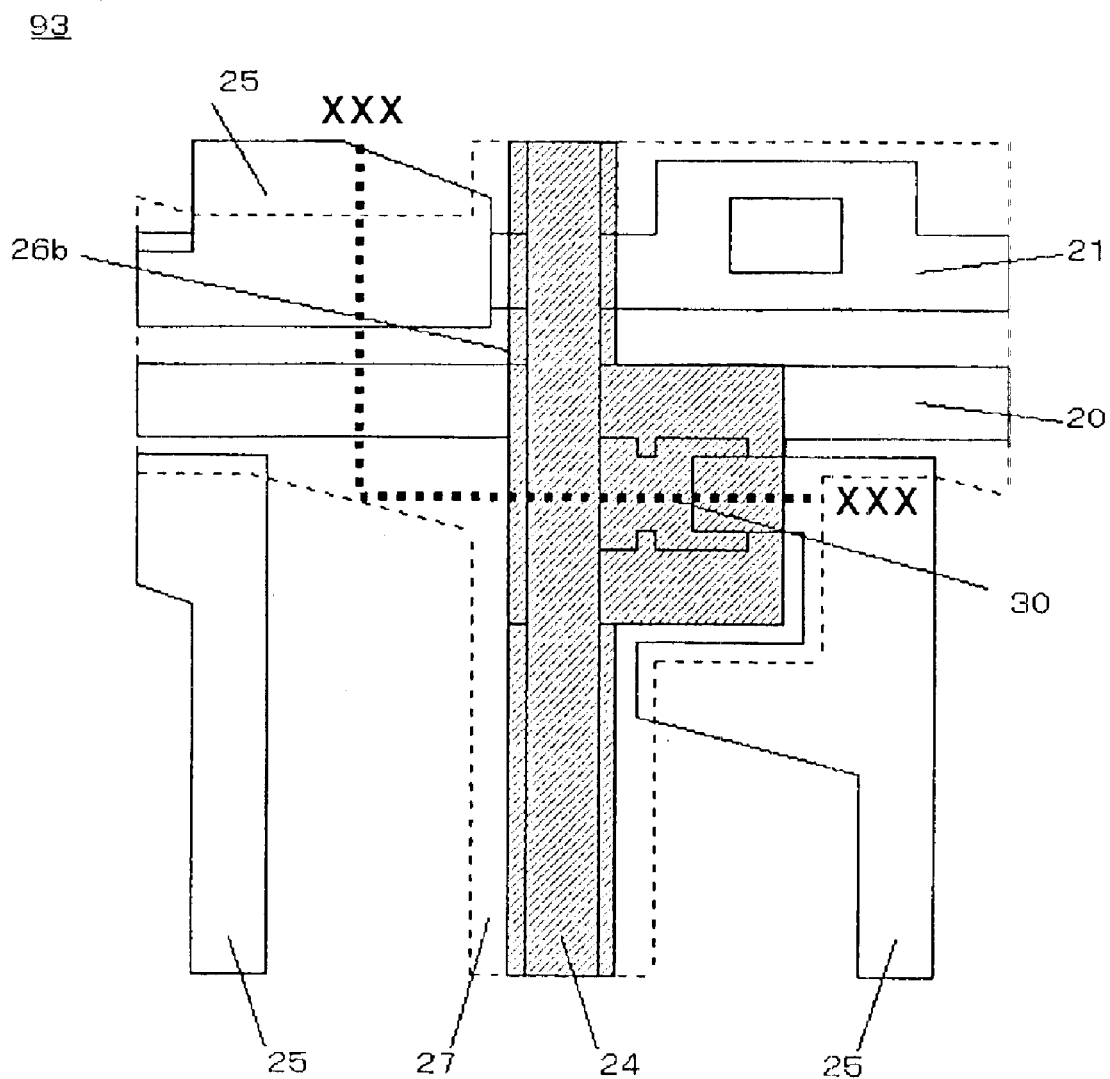
FIG. 29 is a plan view of an in-plane switching mode active matrix type liquid crystal display device in accordance with the tenth embodiment of the present invention.
Figure 30:
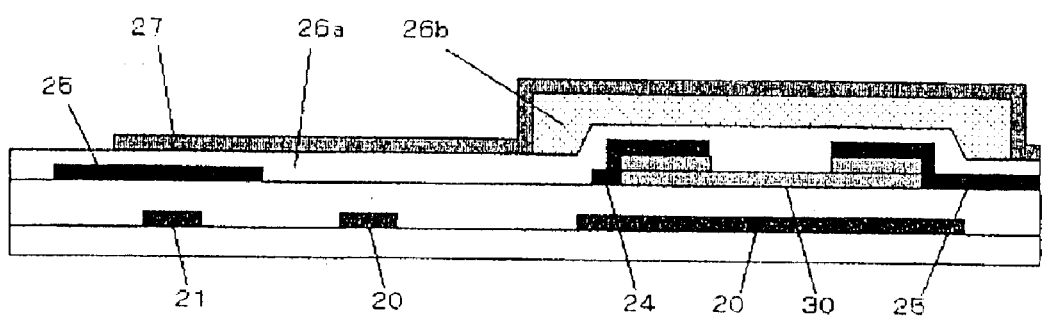
FIG. 30 is a cross-sectional view taken along the line XXX—XXX in FIG. 29.

FIG. 29 is a plan view of an in-plane switching mode active matrix type liquid crystal display device 93 in accordance with the tenth embodiment of the present invention. The liquid crystal display device 93 in accordance with the tenth embodiment is a variant of the liquid crystal display device 92 in accordance with the ninth embodiment. FIG. 30 is a cross-sectional view taken along the line XXX—XXX in FIG. 29.

In the liquid crystal display device 93, the interlayer insulating film 26 is comprised of an inorganic film 26a, and an organic film 26b formed partially on the inorganic film 26a, as illustrated in FIG. 30. The organic film 26b is formed above and in the vicinity of the data line 24 and the thin film transistor 30 such that the organic film 26b covers the data line 24 and the thin film transistor 30 therewith, but does not cover a display area of the pixel electrode 25 therewith.

In accordance with the tenth embodiment, since the organic film 26b is not formed above the scanning line 20, it would be possible not to form a step portion standing at an angle approximately perpendicular to the rubbing axis L (see FIG. 3). As a result, it is possible to reduce foreign materials stuck to a step portion in the rubbing step, ensuring enhancement in display quality.

[Eleventh Embodiment]

Figure 31:
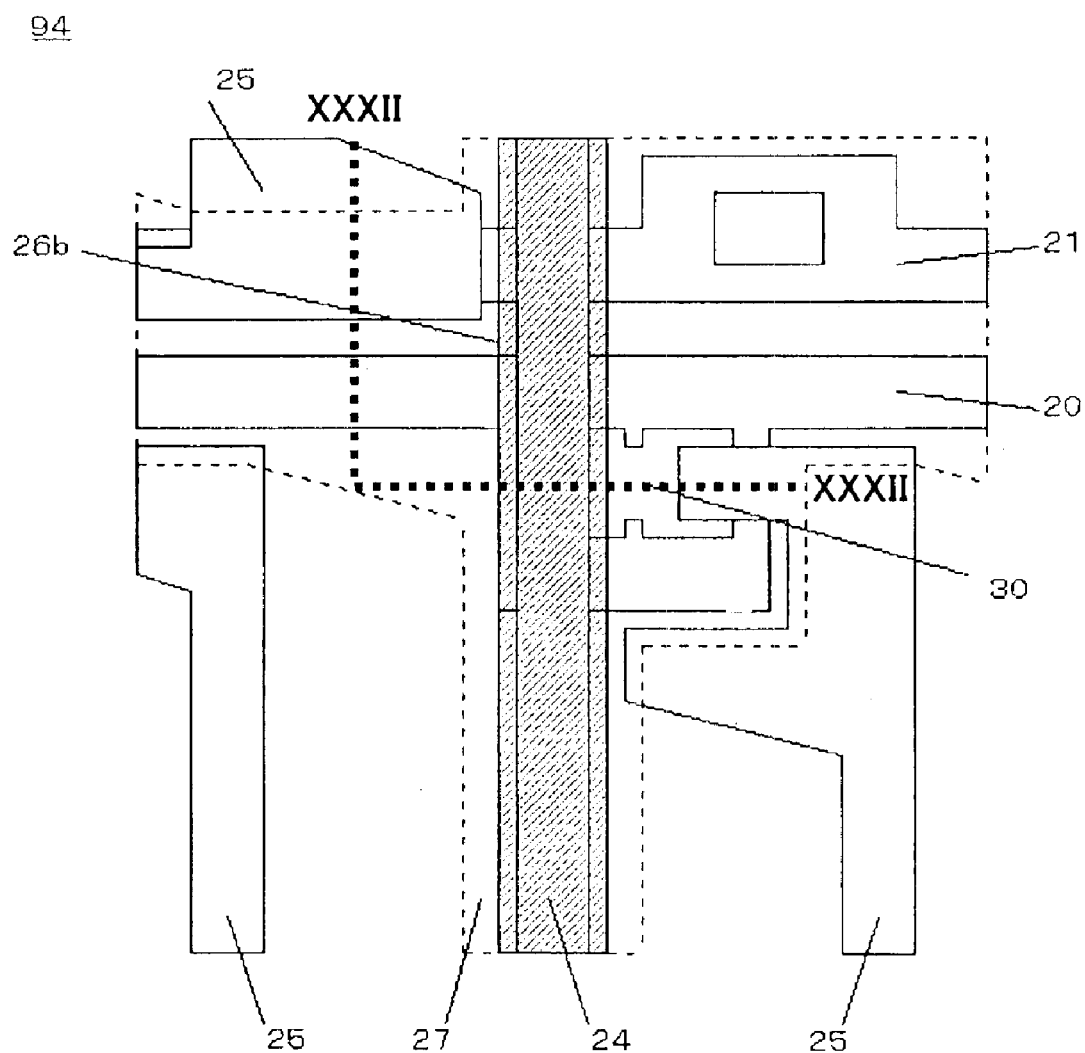
FIG. 31 is a plan view of an in-plane switching mode active matrix type liquid crystal display device in accordance with the eleventh embodiment of the present invention.
Figure 32:
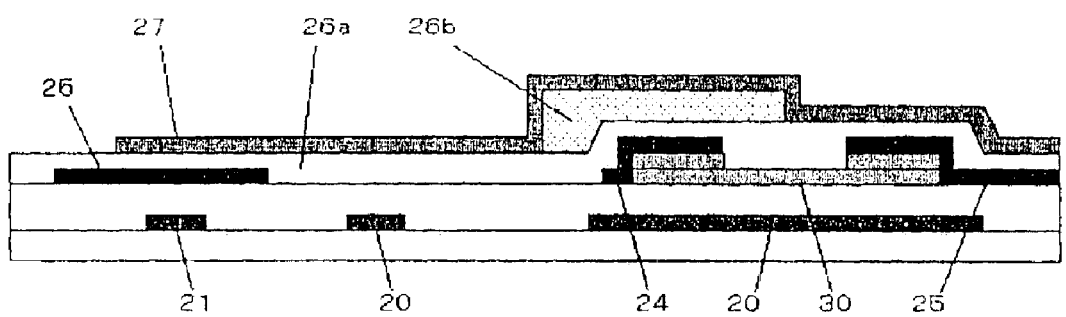
FIG. 32 is a cross-sectional view taken along the line XXXII—XXXII in FIG. 31.

FIG. 31 is a plan view of an in-plane switching mode active matrix type liquid crystal display device 94 in accordance with the eleventh embodiment of the present invention. The liquid crystal display device 94 in accordance with the eleventh embodiment is a variant of the liquid crystal display device 93 in accordance with the tenth embodiment. FIG. 32 is a cross-sectional view taken along the line XXXII—XXXII in FIG. 31.

In the liquid crystal display device 94, the interlayer insulating film 26 is comprised of an inorganic film 26a, and an organic film 26b formed partially on the inorganic film 26a, as illustrated in FIG. 30. The organic film 26b is formed above and in the vicinity of the data line 24 such that the organic film 26b covers the data line 24 therewith, but does not cover a display area of the pixel electrode 25 therewith.

In accordance with the eleventh embodiment, since the organic film 26b is not formed above the scanning line 20 and the thin film transistor 30, it would be possible not to form a step portion standing at an angle approximately perpendicular to the rubbing axis L (see FIG. 3). As a result, it is possible to reduce foreign materials stuck to a step portion in the rubbing step, ensuring enhancement in display quality.

In the liquid crystal display devices 90 to 94 in accordance with the seventh to eleventh embodiments, the organic film 26b may be transparent or opaque. If the organic film 26b is composed of black organic material, the organic film 26b acts as the black matrix layer 17, ensuring it is no longer necessary to form the black matrix layer 17.

[Twelfth Embodiment]

The liquid crystal display devices 10, 40, 50, 60, 70, 80, 90, 91, 92, 93 and 94 in accordance with the first to eleventh embodiments is a single domain type liquid crystal display device.

Herein, a single domain type liquid crystal display device indicates a liquid crystal display device in which an electric field parallel with a plane defined by the active device substrate 11 is applied across the pixel electrode 25 and the common electrode 27 to thereby rotate molecular axes of liquid crystal existing in the liquid crystal layer 13, in a plane parallel with the active device substrate 11.

The first to eleventh embodiments can be applied to a multi-domain liquid crystal display device.

Herein, a multi-domain liquid crystal display device indicates a liquid crystal display device defining a first sub pixel area and a second sub pixel area wherein a first electric field is applied to the first sub pixel area in parallel with a plane of the active device substrate 11 between the pixel electrode 25 and the common electrode 27, and the molecular axes 13 of liquid crystal rotate in the first sub pixel area in a first direction in a plane parallel with the active device substrate 11, and wherein a second electric field is applied to the second sub pixel area in parallel with a plane of the active device substrate 11 between the pixel electrode 25 and the common electrode 27, and the molecular axes 13 of liquid crystal rotate in the second sub pixel area in a second direction which is different from the first direction, in a plane parallel with the active device substrate 11.

The above-mentioned first to eleventh embodiments may be applied not only to a single domain type liquid crystal display device, but also to a multi-domain type liquid crystal display device.

Figure 33A:
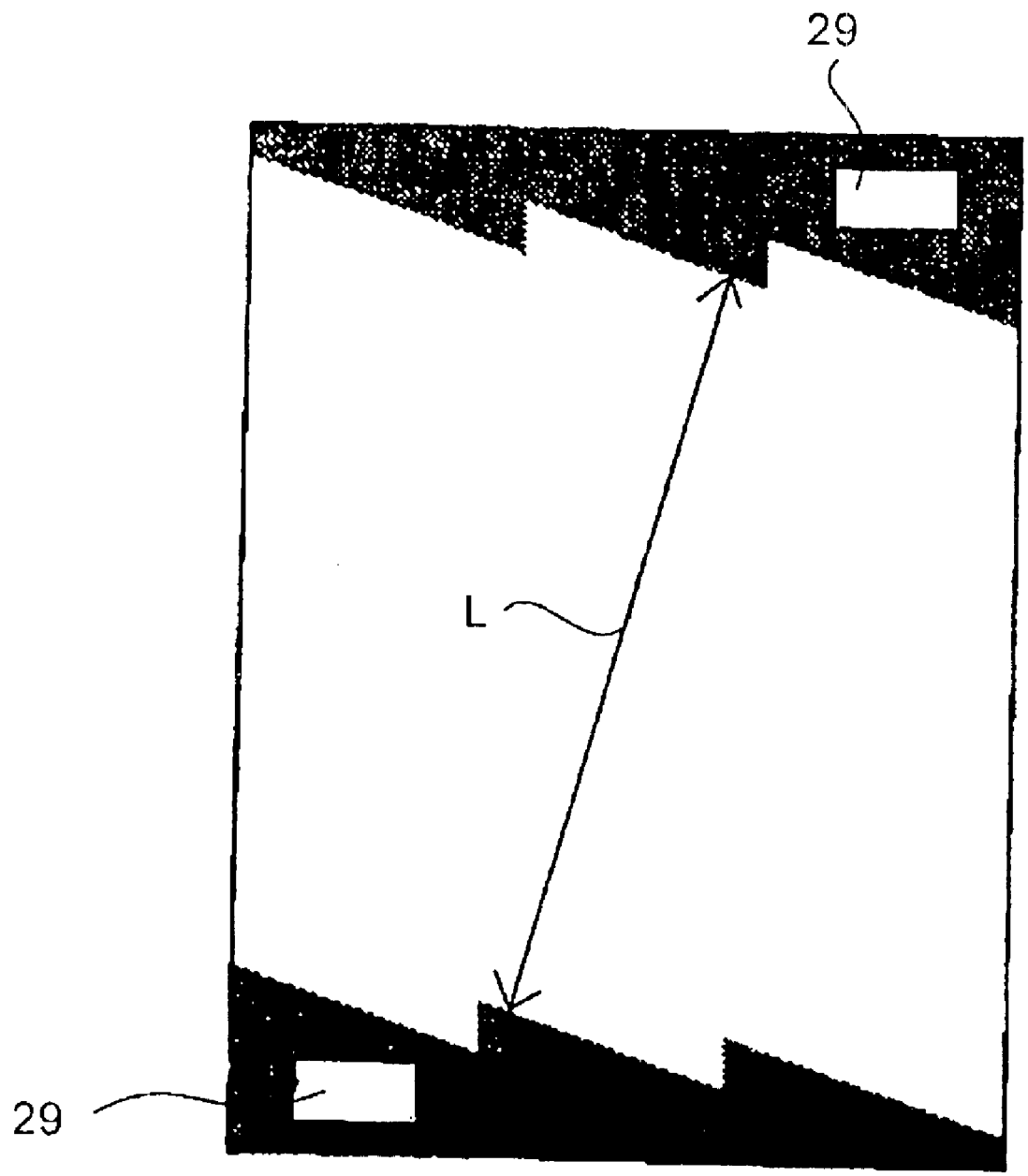
FIG. 33A is a plan view illustrating a first example of a location at which the contact hole is to be formed.

When the liquid crystal display devices in accordance with the first to eleventh embodiments are fabricated as a single-domain liquid crystal display device, it is preferable that the contact hole 29 is formed in the vicinity of one of two corners defining a diagonal line thereacross which is obtained, if a rubbing direction L is given, by rotating the axis in which the data line 24 extends towards the rubbing direction L by an acute angle in a plan view of the pixel, as illustrated in FIG. 33A.

By so positioning the contact hole 29, when a reverse-rotation preventing structure is formed at an end of a pixel for keeping alignment stable, an electrode for preventing reverse-rotation for the common electrode 27 would be formed at the contact hole 29. This ensures efficient arrangement of the contact hole 29 and a reverse-rotation preventing structure for the common electrode 27, thereby an aperture ratio can be enhanced.

Figure 33B:
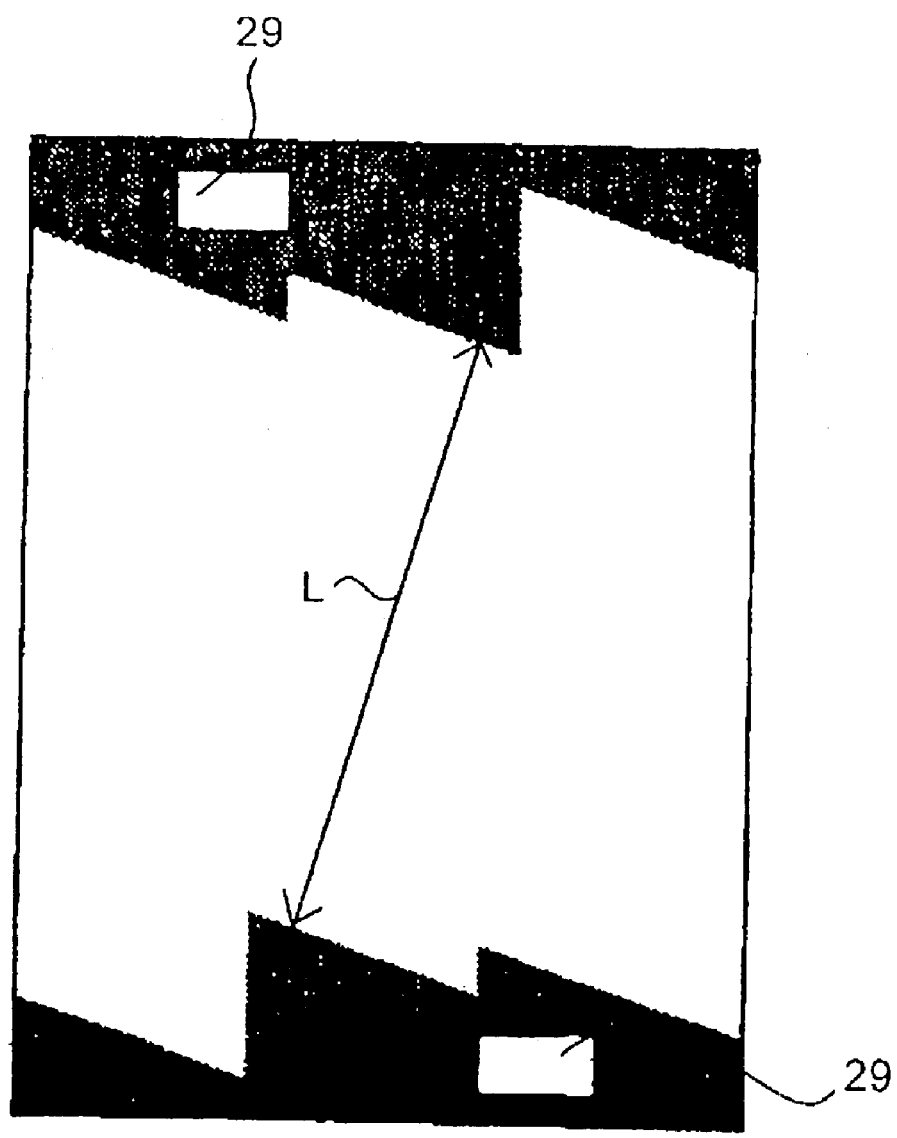
FIG. 33B is a plan view illustrating a second example of a location at which the contact hole is to be formed.

In contrast, if the contact hole 29 is formed in the vicinity of one of two corners defining a diagonal line thereacross which is obtained by rotating the axis in which the data line 24 extends towards the oposition to the rubbing direction L by an acute angle in a plan view of the pixel, as illustrated in FIG. 33B, it would not be possible to form a reverse-rotation structure as mentioned above so efficiently, and the loss of aperture ratio exists because of the angle of the electrodes at the edge.

Figure 34:
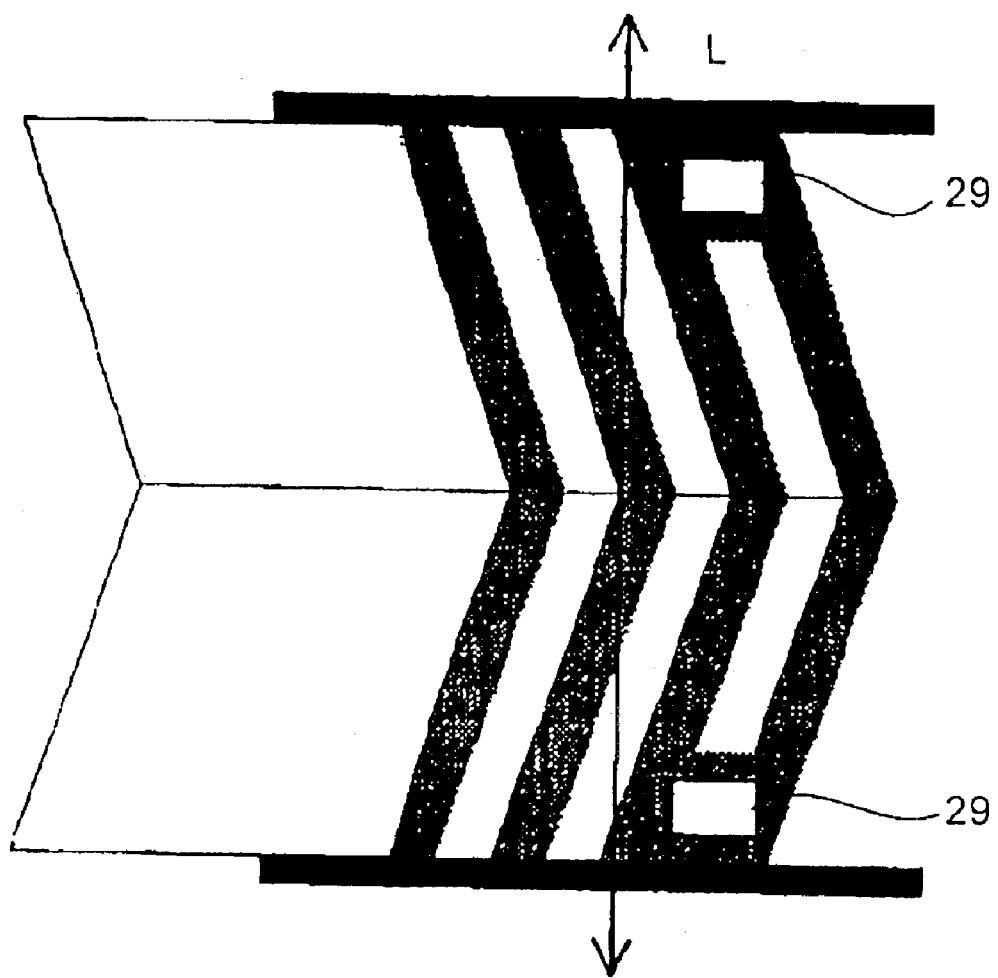
FIG. 34 is a plan view illustrating a third example of a location at which the contact hole is to be formed.

When the liquid crystal display devices in accordance with the first to eleventh embodiments are fabricated as a multi-domain type liquid crystal display device, as illustrated in FIG. 34, it is preferable that the contact hole 29 is formed at any one of corners at which an extension of the common electrode line 21 towards inside of the picture element, and an extension of the common electrode 27 toward the center of the picture element from the common electrode line 21 form an angle of 90 degrees or greater in a plan view of a pixel.

It would be possible to reduce a resistance of the common electrode 27 by electrically connecting the common electrode 27 to the common electrode line 21 through the contact hole 29 in each of pixels.

[Thirteenth Embodiment]

Figure 35:
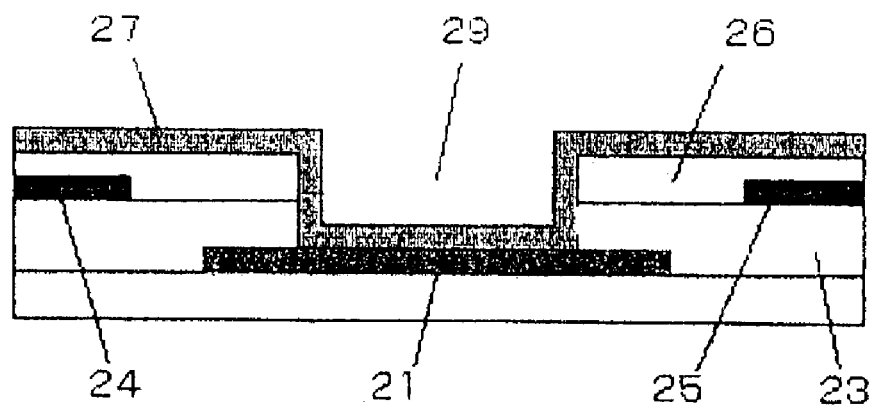
FIG. 35 is a cross-sectional view of an in-plane switching mode active matrix type liquid crystal display device in accordance with the thirteenth embodiment of the present invention.

FIG. 35 is a cross-sectional view of an in-plane switching mode active matrix type liquid crystal display device 100 in accordance with the thirteenth embodiment of the present invention.

As illustrated in FIG. 35, in the liquid crystal display device 100 in accordance with the thirteenth embodiment, the contact hole 29 is formed by concurrently patterning the gate insulating film 23 and the interlayer insulating film 26, where the common electrode line 21 makes direct electrical contact with the common electrode 27.

Since the contact hole 29 is formed by concurrently patterning the gate insulating film 23 and the interlayer insulating film 26 in the thirteenth embodiment, it would be possible for the contact hole 29 to have a greater diameter.

[Fourteenth Embodiment]

Figure 36:
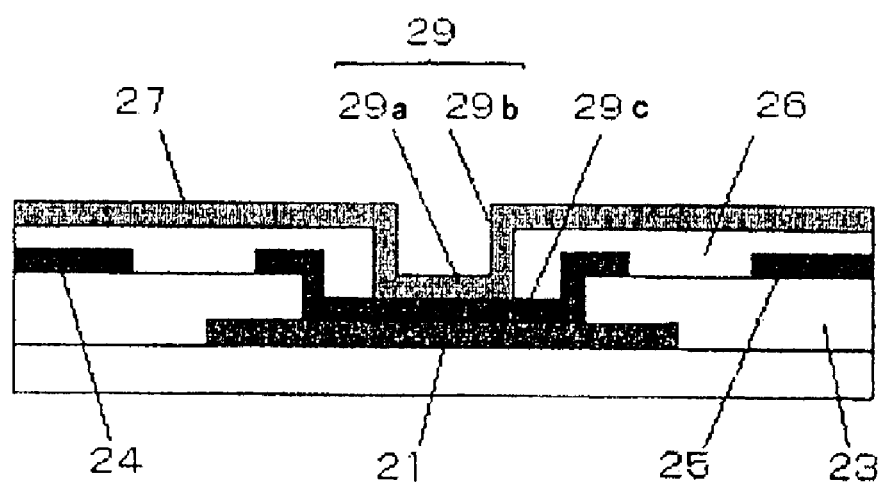
FIG. 36 is a cross-sectional view of an in-plane switching mode active matrix type liquid crystal display device in accordance with the fourteenth embodiment of the present invention.

FIG. 36 is a cross-sectional view of an in-plane switching mode active matrix type liquid crystal display device 110 in accordance with the fourteenth embodiment of the present invention.

As illustrated in FIG. 36, in the liquid crystal display device 110 in accordance with the fourteenth embodiment, the contact hole 29 is comprised of a contact hole 29a formed throughout the gate insulating film 23 and a contact hole 29b formed throughout the interlayer insulating film 26, and the common electrode line 21 and the common electrode 27 are electrically connected to each other through an electrode 29c formed between the gate insulating film 23 and the interlayer insulating film 26.

In accordance with the fourteenth embodiment, since the common electrode line 21 and the common electrode 27 are electrically connected to each other through the electrode 29c, the contact holes 29a and 29b would have a shallow depth when etched for patterning, ensuring reduction in a contact resistance among the common electrode line 21, the electrode 29c and the common electrode 27.

[Fifteenth Embodiment]

In the above-mentioned first to twelfth embodiments, the black matrix layer 17 is formed only above the thin film transistor 30 in an isolated pattern.

The black matrix layer 17 is not to be limited to such a pattern, but it should be noted that the black matrix layer 17 may be formed as follows.

For instance, the black matrix layer 17 may be formed to overlap the thin film transistor 30 and extend in a matrix not only in a direction in which the data line 24 extends, but also in a direction in which the scanning line 20 extends.

The black matrix layer 17 formed in a matrix prevents reflection of a light coming from the data line 24, the scanning line 20 and the common electrode line 21, and hence, enhances display quality.

As an alternative, the black matrix layer 17 may be formed to overlap the thin film transistor 30 and further shield a gap formed between the scanning line 20 and the common electrode line 21.

By designing the black matrix layer 17 to shield a gap formed between the scanning line 20 and the common electrode line 21, it would be possible to hide alignment non-uniformity of the liquid crystal layer 13 generated between the scanning line 20 and the common electrode line 21, ensuring enhancement in display quality.

The black matrix layer 17 may be formed such that an edge or a stepped portion of the black matrix layer 17 is located inside of the scanning line 20, when viewed from upward.

A stepped portion of the black matrix layer 17 causes non-uniformity in displaying images. Hence, by locating a stepped portion of the black matrix layer 17 inside of the scanning line 20, it is possible to hide non-uniformity in displaying images, ensuring enhancement in display quality.

The black matrix layer 17 having a stepped portion located inside of the scanning line 20 would have a minimum size.

The above-mentioned black matrix layers 17 are described as one of embodiments in accordance with the present invention, however, it should be noted that the above-mentioned black matrix layers 17 may be applied not only to an in-plane switching mode active matrix type liquid crystal display device in accordance with the present invention, but also to a conventional in-plane switching mode active matrix type liquid crystal display device.

For instance, the above-mentioned black matrix layers 17 may be applied to liquid crystal display devices suggested in the above-mentioned Japanese Patent Application Publications Nos. 2000-89240 and 2000-81637, for instance.

In the above-mentioned first to fourteenth embodiments, the common electrode 27 is formed with the opening 27a through which a channel of the thin film transistor 30 is exposed. The opening 27a ensures that even if a voltage of the common electrode 27 is inverted with respect to a sign, it would be possible to prevent the thin film transistor 30 from being influenced by such sign inversion.

Though the common electrode 27 as mentioned above is described as one of embodiments in accordance with the present invention in the specification, it should be noted that the above-mentioned common electrode 27 may be applied not only to an in-plane switching mode active matrix type liquid crystal display device in accordance with the present invention, but also to a conventional in-plane switching mode active matrix type liquid crystal display device.

For instance, the above-mentioned common electrode 27 may be applied to liquid crystal display devices suggested in the above-mentioned Japanese Patent Application Publications Nos. 2000-89240 and 2000-81637 or the conventional IPS mode liquid crystal display device illustrated in FIG. 1, for instance.

When the common electrode 27 is applied to a conventional in-plane switching mode active matrix type liquid crystal display device, the common electrode 27 may be composed of transparent or opaque material.

[Sixteenth Embodiment]

The liquid crystal display device 10 in accordance with the first embodiment, the liquid crystal display device 40 in accordance with the second embodiment, the liquid crystal display device 50 in accordance with the third embodiment, the liquid crystal display device 60 in accordance with the fourth embodiment, the liquid crystal display device 70 in accordance with the fifth embodiment, the liquid crystal display device 80 in accordance with the sixth embodiment, the liquid crystal display device 90 in accordance with the seventh embodiment, the liquid crystal display device 91 in accordance with the eighth embodiment, the liquid crystal display device 92 in accordance with the ninth embodiment, the liquid crystal display device 93 in accordance with the tenth embodiment, the liquid crystal display device 94 in accordance with the eleventh embodiment, the liquid crystal display device in accordance with the twelfth embodiment, the liquid crystal display device 100 in accordance with the thirteenth embodiment, the liquid crystal display device 110 in accordance with the fourteenth embodiment or the liquid crystal display device in accordance with the fifteenth embodiment may be applied an electronic device. Hereinbelow, some examples are explained.

Figure 37:
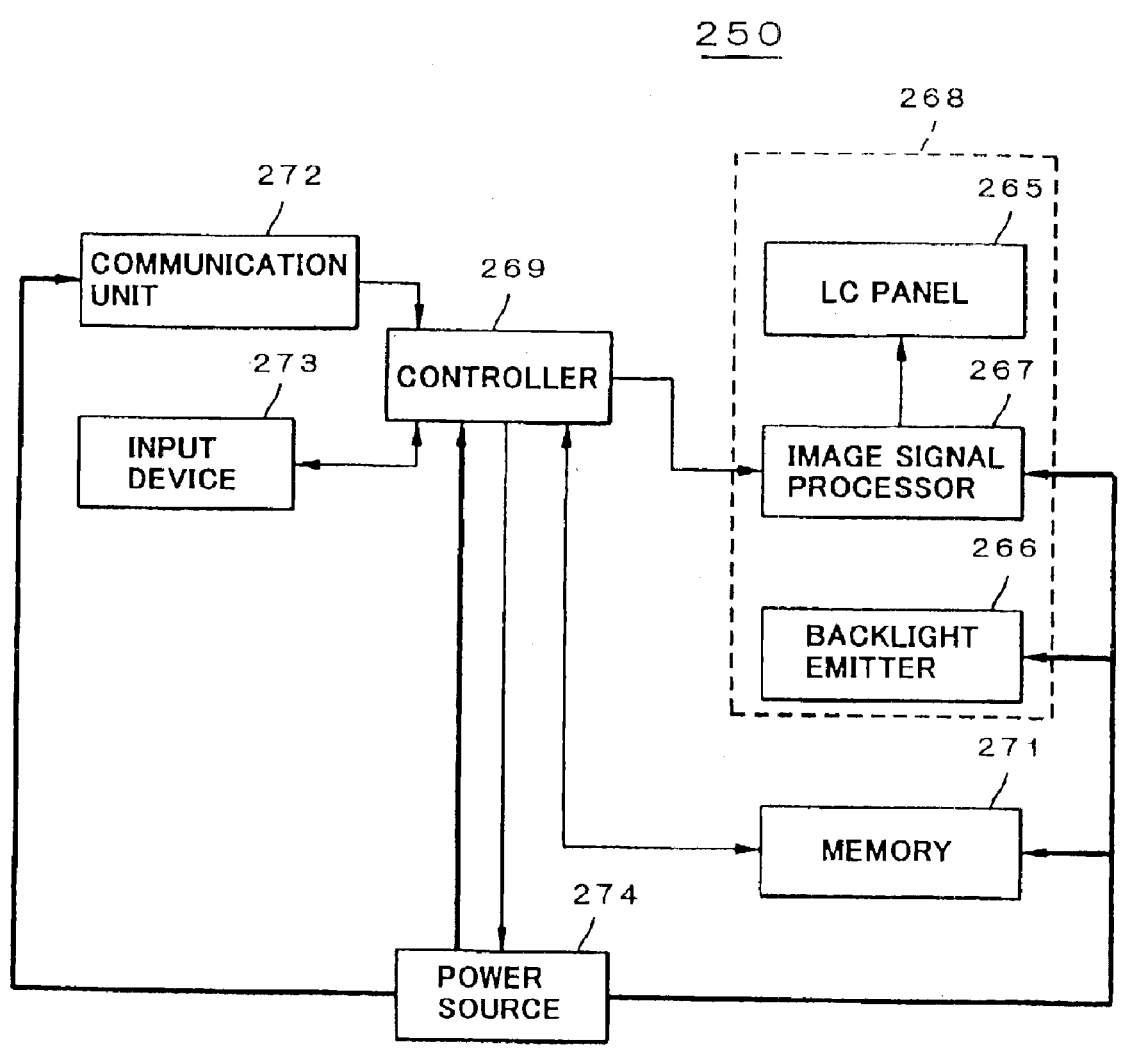
FIG. 37 is a block diagram of a first example of an electronic device in accordance with the sixteenth embodiment of the present invention.

FIG. 37 is a block diagram of a portable communication device 250 to which one of the liquid crystal display devices in accordance with the first to fifteenth is applied. In the portable communication device 250, the liquid crystal display devices in accordance with the above-mentioned embodiments is used as a part of a later mentioned liquid crystal panel 265.

The portable communication terminal 250 is comprised of a display unit 268 including a liquid crystal panel 265, a backlight emitter 266, and an image signal processor 267, a controller 269 controlling operation of the parts constituting the portable communication terminal 250, a memory 271 storing a program to be executed by the controller 269 and various data, a communication unit 272 which makes data communication, an input device 273 comprised of a keyboard or a pointer, and a power source 274 supplying power to the above-mentioned parts constituting the portable communication terminal 250.

The liquid crystal panel 265 including the liquid crystal display device in accordance with one of the above-mentioned embodiments enhances an aperture ratio in the display unit 268, and further enhances a brightness in the display unit 268.

The liquid crystal panel 265 including the liquid crystal display device in accordance with one of the above-mentioned embodiments may be applied to a monitor of a portable personal computer, a note type personal computer, or a desktop type personal computer.

Figure 38:
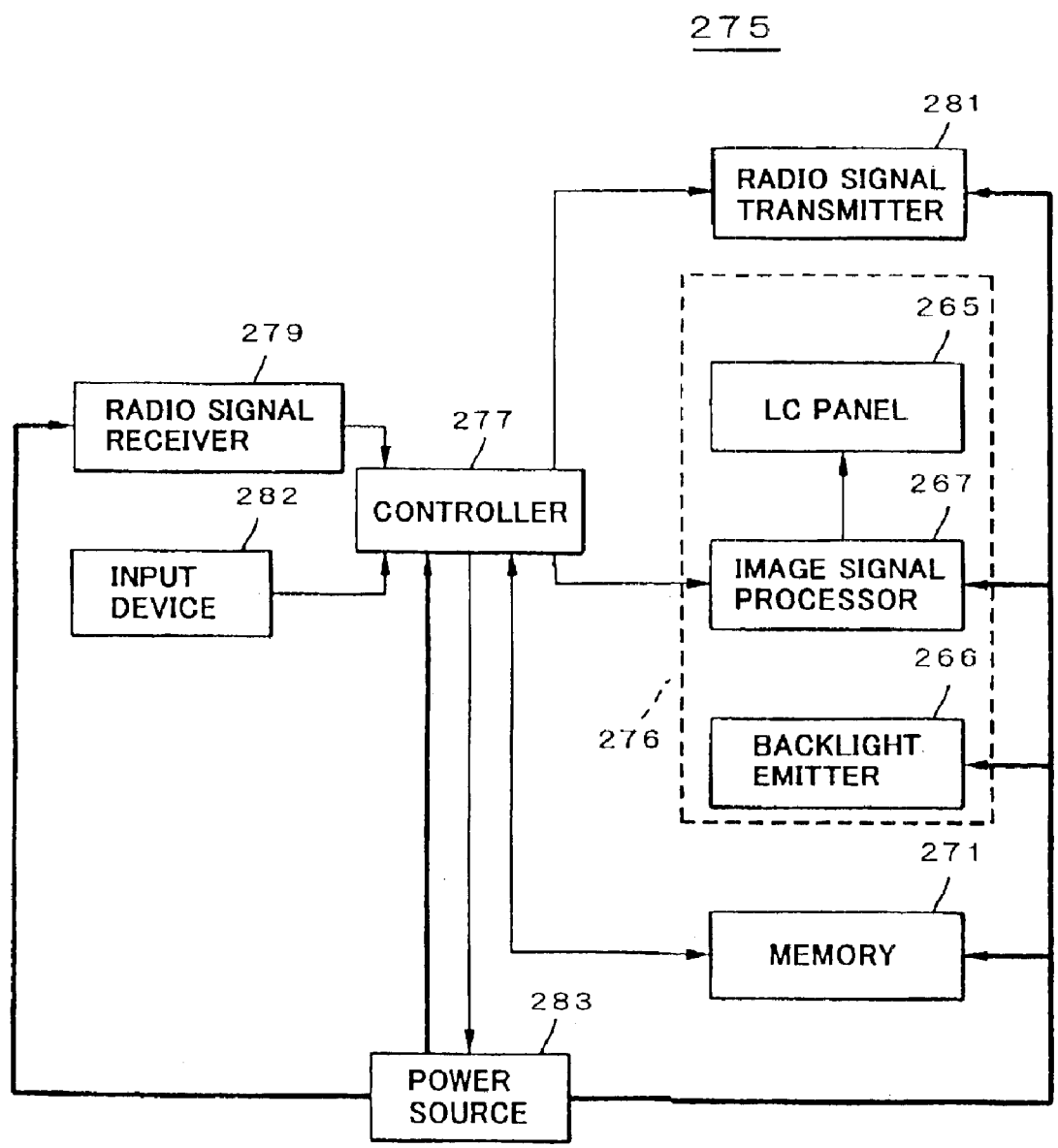
FIG. 38 is a block diagram of a second example of an electronic device in accordance with the sixteenth embodiment of the present invention

FIG. 38 is a block diagram of a cellular phone 275 to which one of the liquid crystal display devices in accordance with one of the above-mentioned embodiments is applied.

The cellular phone 275 is comprised of a display unit 276 including a liquid crystal panel 265, a backlight emitter 266, and an image signal processor 267, a controller 277 controlling operation of the parts constituting the cellular phone 275, a memory 278 storing a program to be executed by the controller 277 and various data, a radio signal receiver 279, a radio signal transmitter 281, an input device 282 comprised of a keyboard or a pointer, and a power source 283 supplying power to the above-mentioned parts constituting the cellular phone 275.

The liquid crystal panel 265 including the liquid crystal display device in accordance with one of the above-mentioned embodiments enhances an aperture ratio in the display unit 276, and further enhances brightness in the display unit 276.

In the above-mentioned first to sixteenth embodiments, the parts by which the present invention is characterized are predominantly explained, and parts known to those skilled in the art are not explained in detail. However, it should be noted that the latter can be readily understood to those skilled in the art without detailed explanation.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications Nos. 2002-103044, 2002-160508 and 2002-164681 filed on Apr. 4, 2002, May 31, 2002 and Jun. 5, 2002, respectively, including specification, claims, drawings and summary is incorporated herein by reference in its entirety.

What is claimed is:

1. An in-plane switching mode active matrix type liquid crystal display device comprising:
    (a) a first substrate;
    (b) a second substrate located opposing said first substrate; and
    (c) a liquid crystal layer sandwiched between said first and second substrates,
    wherein said first substrate includes:

(a1) a thin film transistor having a gate electrode, a drain electrode and a source electrode;

(a2) a pixel electrode each associated to a pixel to be driven;

(a3) a common electrode to which a reference voltage is applied;

(a4) a data line;

(a5) a scanning line; and (a6) a common electrode line, said gate electrode is electrically connected to said scanning line, said drain electrode is electrically connected to said data line, said source electrode is electrically connected to said pixel electrode, and said common electrode is electrically connected to said common electrode line, molecular axes of liquid crystal in said liquid crystal layer are rotated in a plane parallel with said first substrate by an electric field substantially parallel with a plane of said first substrate and to be applied between said pixel electrode and said common electrode, to thereby display images, said scanning line and said common electrode line are formed in a common layer in parallel with each other, said common electrode overlaps said data line and said scanning line with an interlayer insulating film existing therebetween, said common electrode line is singly formed at either side about said scanning line, said common electrode is electrically connected to said common electrode line through a contact hole formed throughout said interlayer insulating film, and said common electrode shields a gap formed between said scanning line and said common electrode line.

2. The in-plane switching mode active matrix type liquid crystal display device as set forth in claim 1, wherein said contact hole is formed in the vicinity of one of two corners defining a diagonal line there across which is obtained, if a rubbing direction is given, by rotating the axis in which the data line extends towards the rubbing direction by an acute angle in a plan view of the pixel.

3. The in-plane switching mode active matrix type liquid crystal display device as set forth in claim 1, wherein said liquid crystal display device defines a first sub pixel area to which a first electric field is applied in parallel with a plane of said first substrate between said pixel and common electrodes, and in which said molecular axes of liquid crystal rotate in a first direction in a plane parallel with said first substrate, and a second sub pixel area to which a second electric field is applied in parallel with a plane of said first substrate between said pixel and common electrodes, and in which said molecular axes of liquid crystal rotate in a second direction in a plane parallel with said first substrate, said second direction being different from said first direction.

4. The in-plane switching mode active matrix type liquid crystal, display device as set forth in claim 3, wherein said contact hole is formed at any one of corners at which an extension of said common electrode line towards inside of the picture element, and an extension of said common electrode towards the center of the picture element from said common electrode line form an angle of 90 degrees or greater in a plan view of a pixel.

5. The in-plane switching mode active matrix type liquid crystal display device as set forth in claim 1, wherein said common electrode extends beyond said data line by at least 3 micrometers in a width-wise direction thereof.

6. The in-plane switching mode active matrix type liquid crystal display device as set forth in claim 1, wherein said common electrode extends beyond said scanning line by at least 1 micrometer in a width-wise direction thereof.

7. The in-plane switching mode active matrix type liquid crystal display device as set forth in claim 1, wherein said common electrode is formed in a layer closer to said liquid crystal layer than said pixel electrode, and said common and pixel electrodes are electrically insulated from each other by an interlayer insulating film.

8. The in-plane switching mode active matrix type liquid crystal display device as set forth in claim 7, wherein said common electrode is formed in a layer closer to said liquid crystal layer than said pixel electrode, and said common and pixel electrodes cooperate with each other to form an accumulation capacity therebetween.

9. The in-plane switching mode active matrix type liquid crystal display device as set forth in claim 7, wherein said pixel electrode and said data line are formed in a common layer.

10. The in-plane switching mode active matrix type liquid crystal display device as set forth in claim 1, wherein said pixel electrode is comprised of a plurality of first portions, and a second portion connecting said first portions at ends thereof to one another, and said second portion is located above said common electrode line and cooperates with said common electrode line to form an accumulation capacity therebetween.

11. The in-plane switching mode active matrix type liquid crystal display device as set forth in claim 10, wherein said second portion is remote from a scanning line in a next stage by 3 micrometers or greater.

12. The in-plane switching mode active matrix type liquid crystal display device as set forth in claim 1, wherein said common electrode is composed of electrically conductive transparent material.

13. The in-plane switching mode active matrix type liquid crystal display device as set forth in claim 1, wherein said pixel electrode is composed of electrically conductive transparent material.

14. The in-plane switching mode active matrix type liquid crystal display device as set forth in claim 1, wherein said interlayer insulating film is comprised of one of a film composed of organic material, a film composed of transparent inorganic material, and a film having a two-layered structure including a film composed of organic material and a film composed of transparent inorganic material.

15. The in-plane switching mode active matrix type liquid crystal display device as set forth in claim 14, wherein said organic material is photosensitive resin.

16. The in-plane switching mode active matrix type liquid crystal display device as set forth in claim 1, wherein said interlayer insulating film is comprised of an organic film and an inorganic film, and said organic film is formed above and in the vicinity of said scanning line, said data line, said common electrode line and said thin film transistor.

17. The in-plane switching mode active matrix type liquid crystal display device as set forth in claim 16, wherein said organic film is formed only inside of a pattern of said common electrode.

18. The in-plane switching mode active matrix type liquid crystal display device as set forth in claim 16, wherein said organic film is composed of photosensitive resin.

19. The in-plane switching mode active matrix type liquid crystal display device as set forth in claim 1, wherein said interlayer insulating film is comprised of an organic film and an inorganic film, and said organic film is formed above and in the vicinity of said scanning line, said data line and said thin film transistor.

20. The in-plane switching mode active matrix type liquid crystal display device as set forth in claim 19, wherein said organic film is formed only inside of a pattern of said common electrode.

21. The in-plane switching mode active matrix type liquid crystal display device as set forth in claim 19, wherein said organic film is composed of photosensitive resin.

22. The in-plane switching mode active matrix type liquid crystal display device as set forth in claim 1, wherein said interlayer insulating film is comprised of an organic film and an inorganic film, and said organic film is formed above and in the vicinity of said data line and said thin film transistor.

23. The in-plane switching mode active matrix type liquid crystal display device as set forth in claim 22, wherein said organic film is formed only inside of a pattern of said common electrode.

24. The in-plane switching mode active matrix type liquid crystal display device as set forth in claim 1, wherein said interlayer insulating film is comprised of an organic film and an inorganic film, and said organic film is formed above and in the vicinity of said data line.

25. The in-plane switching mode active matrix type liquid crystal display device as set forth in claim 24, wherein said organic film is formed only inside of a pattern of said common electrode.

26. The in-plane switching mode active matrix type liquid crystal display device as set forth in claim 22, wherein said organic film is composed of photosensitive resin.

27. The in-plane switching mode active matrix type liquid crystal display device as set forth in claim 24, wherein said organic film is composed of photosensitive resin.

28. The in-plane switching mode active matrix type liquid crystal display device as set forth in claim 1, wherein said thin film transistor is formed at an intersection of said scanning and data lines, and said drain electrode is formed directly of said data line.

29. The in-plane switching mode active matrix type liquid crystal display device as set forth in claim 1, further comprising a black matrix layer formed in a matrix.

30. The in-plane switching mode active matrix type liquid crystal display device as set forth in claim 29, wherein said black matrix layer has a specific resistance of $1\times10^{10}$ Ω·cm or greater.

31. The in-plane switching mode active matrix type liquid crystal display device as set forth in claim 1, further comprising a black matrix layer formed in an isolated pattern only above said thin film transistor for overlapping said thin film transistor.

32. The in-plane switching mode active matrix type liquid crystal display device as set forth in claim 31, wherein said black matrix layer has a specific resistance of $1\times10^{10}$ Ω·cm or greater.

33. The in-plane switching mode active matrix type liquid crystal display device as set forth in claim 1, further comprising a color layer defining a color filter, said color layer having an edge extending in parallel with said data line.

34. The in-plane switching mode active matrix type liquid crystal display device as set forth in claim 33, further comprising color layers defining a color filter, said color layers being arranged in such a manner that adjacent color layers are arranged without a gap therebetween or partially overlap each other.

35. The in-plane switching mode active matrix type liquid crystal display device as set forth in claim 1, further comprising a pillar-shaped pattern formed between said scanning line and said common electrode line for ensuring a gap between said first and second substrates.

36. The in-plane switching mode active matrix type liquid crystal display device as set forth in claim 1, wherein liquid crystal-in said liquid crystal layer has dielectric constant anisotropy $\Delta\in$ of 9 or greater.

37. The in-plane switching mode active matrix type liquid crystal display device as set forth in claim 1, wherein liquid crystal in said liquid crystal layer has dielectric constant anisotropy $\Delta\in$ of 11 or greater.

38. The in-plane switching mode active matrix type liquid crystal display device as set forth in claim 1, wherein liquid crystal in said liquid crystal layer has an N/I point of 80 degrees centigrade or higher.

39. The in-plane switching mode active matrix type liquid crystal display device as set forth in claim 1, wherein said common electrode is formed above a channel of said thin film transistor with an opening having an end remote from an end of said channel by a predetermined distance.

40. The in-plane switching mode active matrix type liquid crystal display device as set forth in claim 1, further comprising a reverse-rotation preventing structure in a sub pixel area in which all liquid crystal molecules are rotated in the same direction, for preventing liquid crystal molecules from rotating in a direction opposite to said same direction,
  said reverse-rotation preventing structure including an auxiliary electrode to which a voltage equal to a voltage of at least one of said pixel electrode and said common electrode is applied such that a direction of a rubbing axis is identical in said sub pixel area with a direction of an electric field generated in said sub pixel area, if said rubbing axis rotates by an acute angle.

41. The in-plane switching mode active matrix type liquid crystal display device as set forth in claim 1, wherein said data line is electrically connected around a display area to a first protection circuit formed in the same layer as a layer in which said scanning line is formed, through a contact hole formed throughout an electrically insulating film, and said scanning line is electrically connected around a display area to a second protection circuit formed in the same layer as a layer in which said data line is formed, through a contact hole formed throughout said electrically insulating film.

42. The in-plane switching mode active matrix type liquid crystal display device as set forth in claim 1, wherein said data line is electrically connected around a display area to a first protection circuit formed in the same layer as a layer in which said scanning line is formed, through a contact bole formed throughout an electrically insulating film and further through an electrically conductive pattern formed on a layer formed on said electrically insulating film, and said scanning line is electrically connected around a display area to a second protection circuit formed in the same layer as a layer in which said data line is formed, through a contact hole formed throughout said electrically insulating film and further through an electrically conductive pattern formed on a layer formed on said electrically insulating film.

43. An electronic device including an in-plane switching mode active matrix type liquid crystal display device comprising:
  (a) a first substrate;
  (b) a second substrate located opposing said first substrate; and
  (c) a liquid crystal layer sandwiched between said first and second substrates,
  wherein said first substrate includes:
  (a1) a thin film transistor having a gate electrode, a drain electrode and a source electrode;

(a2) a pixel electrode each associated to a pixel to be driven;

(a3) a common electrode to which a reference voltage is applied;

(a4) a data line;

(a5) a scanning line; and (a6) a common electrode line, said gate electrode is electrically connected to said scanning line, said drain electrode is electrically connected to said data line, said source electrode is electrically connected to said pixel electrode, and said common electrode is electrically connected to said common electrode line, molecular axes of liquid crystal in said liquid crystal layer are rotated in a plane parallel with said first substrate by an electric field substantially parallel with a plane of said first substrate and to be applied between said pixel electrode and said common electrode, to thereby display images, said scanning line and said common electrode line are formed in a common layer in parallel with each other, said common electrode overlaps said data line and said scanning line with an interlayer insulating film existing therebetween, said common electrode line is singly formed at either side about said scanning line, said common electrode is electrically connected to said common electrode line through a contact hole formed throughout said interlayer insulating film, and said common electrode shields a gap formed between said scanning line and said common electrode line.

44. A method of fabricating an in-plane switching mode active matrix type liquid crystal display device comprising:

(a) a first substrate;

(b) a second substrate located opposing said first substrate; and (c) a liquid crystal layer sandwiched between said first and second substrates, wherein said first substrate includes:

(a1) a thin film transistor having a gate electrode, a drain electrode and a source electrode;

(a2) a pixel electrode each associated to a pixel to be driven;

(a3) a common electrode to which a reference voltage is applied;

(a4) a data line;

(a5) a scanning line; and (a6) a common electrode line, said gate electrode is electrically connected to said scanning line, said drain electrode is electrically connected to said data line, said source electrode is electrically connected to said pixel electrode, and said common electrode is electrically connected to said common electrode line, molecular axes of liquid crystal in said liquid crystal layer are rotated in a plane parallel with said first substrate by an electric field substantially parallel with a plane of said first substrate and to be applied between said pixel electrode and said common electrode, to thereby display images, said method comprising the steps of:

(a) forming said scanning line and said common electrode line in a common layer in parallel with each other wherein said common electrode line is singly formed at either side about said scanning line;

(b) forming an interlayer insulating firm over said data line and said scanning line;

(c) forming a contact hole throughout said interlayer insulating film; and (d) forming said common electrode on said interlayer insulating film such that said common electrode is electrically connected to said common electrode line through said contact hole and said common electrode shields a gap formed between said scanning line and said common electrode line.

45. The method as set forth in claim 44, further comprising the step of forming said pixel electrode and said data line in a common layer.

46. The method as set forth in claim 44, further comprising the step of forming said pixel electrode comprised of a plurality of first portions, and a second portion connecting said first portions at ends thereof to one another, wherein said second portion is located above said common electrode line and cooperates with said common electrode line to form an accumulation capacity therebetween.

47. The method as set forth in claim 44, further comprising the step of forming said interlayer insulating film so as to have a two-layered structure including an organic film and an inorganic film.

48. The method as set forth in claim 44, further comprising the step of forming said interlayer insulating film so as to have a two-layered structure including an organic film and an inorganic film wherein and said organic film is formed above and in the vicinity of said scanning line, said data line, said common electrode line and said thin film transistor.

49. The method as set forth in claim 44, further comprising the step of forming said interlayer insulating film so as to have a two-layered structure including an organic film and an inorganic film wherein and said organic film is formed above and in the vicinity of said scanning line, said data line and said thin film transistor.

50. The method as set forth in claim 44, further comprising the step of forming said interlayer insulating film so as to have a two-layered structure including an organic film and an inorganic film wherein and said organic film is formed above and in the vicinity of said data line and said thin film transistor.

51. The method as set forth in claim 44, further comprising the step of forming said interlayer insulating film so as to have a two-layered structure including an organic film and an inorganic film wherein and said organic film is formed above and in the vicinity of said data line.

52. The method as set forth in claim 44, further comprising the step of forming a black matrix layer in an isolated pattern only above said thin film transistor for overlapping said thin film transistor.

53. The method as set forth in claim 44, further comprising the step of forming a color layer defining a color filter such that said color layer has an edge extending in parallel with said data line.

54. The method as set forth in claim 44, further comprising the step of forming color layers defining a color filter such that said color layers are arranged in such a manner that adjacent color layers are arranged without a gap therebetween or partially overlap each other.

55. The method as set forth in claim 44, further comprising the step of forming a pillar-shaped pattern on at least one of said first and second substrates between said scanning line and said common electrode line for ensuring a gap between said first and second substrates.

56. The method as set forth in claim 44, further comprising the step of forming said common electrode above a channel of said thin film transistor with an opening having an end remote from an end of said channel by a predetermined distance.

57. The method as set forth in claim 44, further comprising the step of electrically connecting said data line around a display area to a first protection circuit formed in the same layer as a layer in which said scanning line is formed, through a contact hole formed throughout an electrically insulating film, and further electrically connecting said scanning line around a display area to a second protection circuit formed in the same layer as a layer in which said data line is formed, through a contact hole formed throughout said electrically insulating film.

58. The method as set forth in claim 44, further comprising the step of electrically connecting said data line around a display area to a first protection circuit formed in the same layer as a layer in which said scanning line is formed, through a contact hole formed throughout an electrically insulating film and further through an electrically conductive pattern formed on a layer formed on said electrically insulating film, and further electrically connecting said scanning line around a display area to a second protection circuit formed in the same layer as a layer in which said data line is formed, through a contact hole formed throughout said electrically insulating film and further through an electrically conductive pattern formed on a layer formed on said electrically insulating film.

* * * * *